United States Patent [19]
Norton

[11] Patent Number: 5,571,994
[45] Date of Patent: Nov. 5, 1996

[54] WEATHERPROOF SEAL FOR WIRE ENTRANCE

[76] Inventor: Peter Norton, 1 S. Lakeside, Lake Hopatcong, N.J. 07849

[21] Appl. No.: 183,134

[22] Filed: Jan. 18, 1994

Related U.S. Application Data

[62] Division of Ser. No. 776,871, Oct. 16, 1991, abandoned, which is a division of Ser. No. 529,716, May 25, 1990, abandoned, which is a continuation of Ser. No. 364,640, Jun. 12, 1989, abandoned, which is a continuation-in-part of Ser. No. 262,732, Oct. 26, 1988, abandoned, which is a continuation-in-part of Ser. No. 218,917, Jul. 14, 1988, abandoned, which is a continuation-in-part of Ser. No. 190,165, May 4, 1988, abandoned.

[51] Int. Cl.[6] ........................................... H02G 3/18
[52] U.S. Cl. .................. 174/65 R; 174/151; 174/DIG. 8; 248/56
[58] Field of Search ................ 174/65 R, 151, 174/DIG. 8; 248/56

[56] References Cited

U.S. PATENT DOCUMENTS

| | | | |
|---|---|---|---|
| 1,960,938 | 5/1934 | Forbes | 174/151 X |
| 2,997,557 | 8/1961 | Gillmor et al. | 200/61.45 |
| 3,104,277 | 9/1963 | Bossu | 174/151 |
| 3,602,049 | 8/1971 | Albert | 200/61.53 X |
| 3,622,974 | 11/1971 | Best | 280/735 |
| 3,629,816 | 12/1971 | Gillund | 280/735 X |
| 3,849,759 | 11/1974 | Hosaka et al. | 340/436 X |
| 3,863,208 | 1/1975 | Balban | 280/735 |
| 3,889,130 | 6/1975 | Breed | 307/121 |
| 3,974,350 | 8/1976 | Breed | 200/61.53 |
| 4,054,744 | 10/1977 | Beaman | 174/151 |
| 4,097,699 | 6/1978 | Larson | 20/61.45 R |
| 4,163,268 | 7/1979 | Spies et al. | 280/735 X |
| 4,284,863 | 8/1981 | Breed | 200/61.53 |
| 4,287,431 | 9/1981 | Yasui et al. | 280/735 X |
| 4,329,549 | 5/1982 | Breed | 200/61.45 M |
| 4,816,309 | 3/1989 | Hutt et al. | 174/DIG. 8 |
| 4,816,627 | 3/1989 | Janotik | 200/61.45 M |
| 4,835,513 | 5/1989 | McCurdy et al. | 340/438 |
| 4,839,479 | 6/1989 | Davis, Jr. | 200/61.45 R |
| 4,843,877 | 7/1989 | Kushida et al. | 73/517 R |
| 4,851,705 | 7/1989 | Musser et al. | 280/735 X |
| 4,893,109 | 12/1990 | Vrabel et al. | 340/438 |
| 4,932,260 | 6/1990 | Norton | 73/517 B |
| 5,109,603 | 5/1992 | Boulanger | 174/65 R |

*Primary Examiner*—Kristine L. Kincaid
*Assistant Examiner*—Paramita Ghosh
*Attorney, Agent, or Firm*—Reising, Ethington, Barnard & Perry

[57] ABSTRACT

A weatherproof seal for wire entrance into an enclosure for an electrical device in an automobile. The seal including a tubular element adapted for the passage of the wires entering the enclosure and a wrapper wrapped about the tubular element and also wrapped about a length of the wires outside of the tubular element and adjacent to one end of the tubular element. The wrapper including heat shrinkable tubing having a lining of meltable material that has been placed around the tubular element and the length of the wires and heated sufficiently to melt the meltable material and cause the heat shrinkable tubing to shrink.

3 Claims, 12 Drawing Sheets

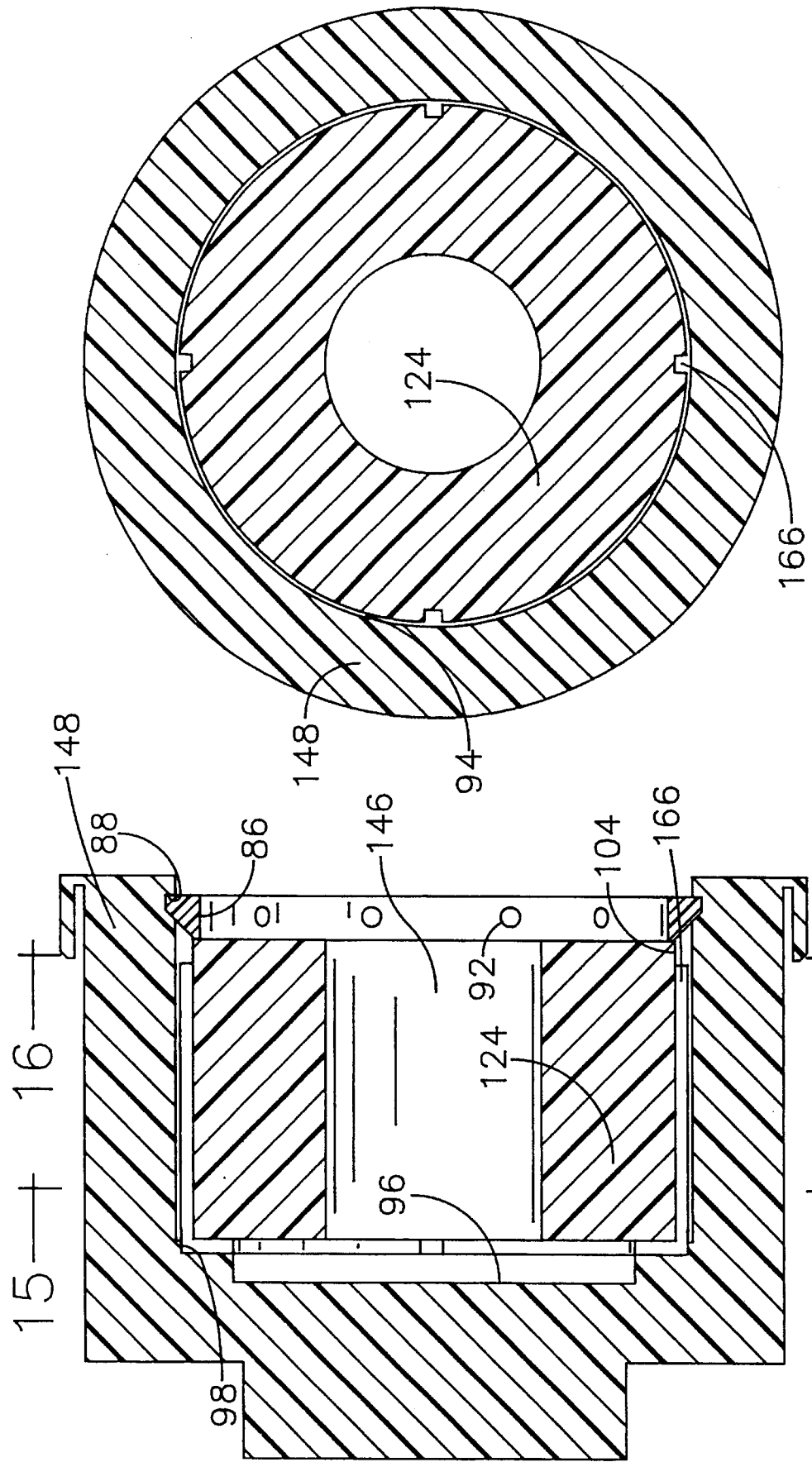

WEATHERPROOF SEAL FOR WIRE ENTRANCE

This application is a division of U.S. Ser. No. 07/776,871, filed Oct. 16, 1991 (now abd.); which is a division of U.S. Ser. No. 07/529,716, filed May 25, 1990 (now abd.); which is a continuation of U.S. Ser. No. 07/364,640, filed Jun. 12, 1989 (now abd.); which is a continuation-in-part of U.S. Ser. No. 07/262,732, filed Oct. 26, 1988 (now abd.); which is a continuation-in-part of U.S. Ser. No. 07/218,917, filed Jul. 14, 1988 (now abd.); which is a continuation-in-part of U.S. Ser. No. 07/190,165, filed May 4, 1988 (now abd.).

FIELD OF THE INVENTION

This invention relates to switches that close upon frontal collision of automobiles for activating occupant protection devices such as air bags or belt tensioners. It also pertains to diagnostic systems for monitoring the occupant protection system for insuring a correct firing circuit.

BACKGROUND OF THE INVENTION

Air bags are inflatable bags that remain folded and out of sight in readiness for a frontal collision. During a collision, chemical reaction of a material typically containing sodium azide produces gaseous products which inflate the bag and interpose it between the driver and the steering wheel or the front seat occupant and the dashboard.

Belt tensioners are devices that tighten automobile seat belts during a crash to hold the seat occupants more securely. A tensioner has a small motor driven by pressurized gas from the chemical reaction of gas generating material like that used for inflating air bags. In both cases, chemical reaction of the gas generating material is initiated by an electrically heated squib. The crash sensor of this invention is a switch for controlling the power that energizes the squib.

In the United States automobiles having electrically initiated air bag inflators are required by law to incorporate diagnostic capability to warn the driver of a failure in the firing circuit.

A crash sensor of the type to which this invention is applicable is in commercial production. It consists of a metallic ball free to move in a sealed tube containing contacts that are bridged by the ball when it moves to one end of the tube. Air flow around the ball causes a pressure differential. The pressure differential causes a force proportional to and opposite the relative velocity of the ball with respect to the tube, A permanent magnet provides a bias force that retains the ball in a normal resting position away from the contacts and causes the velocity change required for switch closure to increase with the duration of the crash pulse. The proportionality of force to velocity makes the crash sensor an acceleration integrator that completes the firing circuit upon achievement of a predetermined velocity change. The variation of air viscosity with temperature is compensated for by making the tube and ball of particular and different stainless steels selected to have a difference in their thermal expansion coefficients such that the gap between the ball and tube changes with temperature as required to maintain the performance of the crash sensor over a wide temperature range. An elastomeric seal allows the tube to move in a plane perpendicular to the axis of the tube to prevent transmission of cross axis accelerations to the ball and the tube.

This crash sensor is expensive to manufacture and one reason for the cost is the high precision required of the ball and the tube. Another reason for the high cost for certain applications is that the tube must be made of material that is difficult to machine. Another reason for the high cost is the requirement in the present design that the electrical contacts must remain in good electrical contact with the ball as the ball moves over a distance of about one fourth of an inch. Further, in known designs, the contacts are connected with leadin wires and a diagnostic resistor by means such as welding or soldering. These processes create contamination during manufacturing that cannot be tolerated in the vicinity of the ball and tube thereby requiring additional components and processing steps to maintain isolation for cleanliness. Also, the thin material required for the contacts to have the required flexibility has the disadvantages of being difficult to handle and to connect with leadin wires of heavier material. Further, the diagnostic resistor must be a good quality resistor of relatively high precision which is not inexpensive.

The performance of this crash sensor depends upon flow of air between the ball and the inner diameter of the tube and is subject to a degree of variability depending on whether the ball moves near the center of the tube or near the inner wall. During a crash the venturi effect creates aerodynamic forces that urge the ball toward the center of the tube whereas lateral accelerations urge the ball toward a wall. When the ball moves near the wall there is a crescent shaped air channel between the ball and the tube. When the ball moves near the center of the tube there is an annular shaped air channel between the ball and the tube. The crescent shaped opening has about one half of the resistance to air flow as the annular opening. Therefore, the velocity change required for the ball to bridge the contacts varies substantially depending on the path of the ball.

Other crash sensors of similar design use a spring, typically one of the contacts, to provide the bias force that retains the ball in its home position. The permanent magnet bias seems to be preferable because of its simplicity but the two designs can be used interchangeably.

A safing sensor is a second crash sensor typically located on the firewall or elsewhere in the interior of the vehicle and is wired in series with one or more crash sensors located near the front of the vehicle. It prevents deployment of occupant protection systems in the event of sharp blows to a forward crash sensor which would not warrant deployment of the system.

Diagnostic systems typically include a diagnostic resistor that supplies a small current to the firing circuit during normal operation and means for monitoring that small current. Absence of the current indicates an open firing circuit. It is also desirable for the diagnostic system to detect small variations in the resistance of the firing circuit such as might be caused by corrosion of connectors. Circuits to accomplish this require high precision and current systems do not perform this function as well as is desired.

A circuit for measuring resistance is disclosed by the present inventor in U.S. Pat. No. 5,115,188 granted May 19, 1992 and titled *Resistance Sensor And Switch*.

A crash sensor having armature movement that is viscously damped by air viscosity and in which compensation for variation of air viscosity with temperature is accomplished by varying the normal resting position of the armature is disclosed by the present inventor in copending application Ser. No. 166,044 filed Mar. 9, 1988 and titled *Mechanical Crash Sensing Switch With Latching In The Closed Position*, now abandoned.

Integrated electronic circuits commonly include on a single chip of silicon both switching power transistors for controlling substantial power and circuitry for making the decisions as to when the switching power transistors should be conducting and not conducting. This circuitry may include voltage comparators, timing devices, and circuits for performing boolean logic.

Connections to semiconductor devices including integrated circuits are commonly made by attaching fine wires of materials such as gold or aluminum to pads on the semiconductor formed for that purpose. The pads are areas of the semiconductor chip that are sufficiently large for attachment to be made reliably by methods such as acoustic welding. The pads and the connections between the pads and the circuits on the semiconductor chip are made as part of the process of making the circuitry on the semiconductor chip.

Completed semiconductor chips are commonly mounted on a substrate which may be metal, ceramic, plastic, or other suitable material. The substrate typically includes connector pins for connecting the completed semiconductor device to other equipment. The pads on the chip are commonly connected to the connector pins by stitch bonding. The delicate chip and wiring of the electrically complete device are protected by encapsulation. Many encapsulation methods are known and several have been highly developed to meet the needs of the semiconductor industry. One method is to cover the completed chip and wiring with a small can and solder the can to the substrate which forms a hermetic seal. Another is to place the completed chip and wiring in a mold and flood the mold with uncured thermosetting plastic which is cured to form the required encapsulation.

Circuits for driving MOSFET power transistors are described in the literature. A review of such circuits is provided by chapter 6 of the second edition of *POWER MOSFET TRANSISTOR DATA* copyright 1986 and published by Motorola Inc.

A general object of this invention is to provide a crash sensor and diagnostic system for automotive vehicles which overcomes certain disadvantages of the prior art.

SUMMARY OF THE INVENTION

The present invention provides a crash sensor of the type having a viscously damped ball movable in a sealed tube with sensing means to sense when the ball has reached a firing position which is highly reliable, compact, light in weight, and economical to manufacture. The ball and tube are sized to use very small amounts of the most economical materials.

Further, in accordance with this invention, a semiconductor switch controls the power to the firing circuit thereby minimizing the current that must be carried by the ball and the contacts.

Further, in accordance with this invention, the semiconductor switch remains closed for a sufficient time to initiate deployment of the occupant protection systems once it is closed thereby eliminating the contact dwell requirements of crash sensors lacking a semiconductor switch.

Further, in accordance with this invention, the semiconductor switch is controlled by a simple drive circuit that is inexpensive to make.

Further, in accordance with this invention, the sensing means comprise contacts which are simple elements attached to pads on the semiconductor by techniques well known in the semiconductor manufacturing industry.

Further, in accordance with an embodiment of this invention in which all air displaced by the movement of the ball is routed between the ball and the tube, the small size of the ball and tube result in tolerances and required thermal expansion coefficients which allow the use of a plastic or aluminum tube of greatly reduced cost relative to current designs.

Further, in accordance with a second embodiment of this invention, the air displaced by the movement of the ball preponderantly moves through axial channels at the outer surface of the tube which resides in a cavity. This reduces the variability in the viscous resistance to air flow compared with crash sensors in which the air path is between the ball and the inner diameter of the tube.

Further, in accordance with the aforementioned second embodiment of this invention, the size of the air channels may vary with temperature to maintain a constant resistance to air flow at all operating temperatures.

Further, in accordance with a third embodiment of this invention, the air displaced by the movement of the ball preponderantly moves through axial channels formed in the inner surface of the tube. The ball confines the air to these channels. This reduces the variability in the viscous resistance to air flow compared with crash sensors in which the air path is between the ball and the inner surface of the tube.

Further, in accordance with this invention, the small size of the ball and tube combined with the use of a semiconductor switch result in a total system size similar to the sizes of semiconductor devices which in combination with the fact that the electrical components comprise a semiconductor enable use of electrical connection techniques and equipment and encapsulation techniques and equipment that have been highly developed for the semiconductor industry.

Further, in accordance with this invention, the switch incorporates a Sensefet transistor in a resistance measuring circuit that monitors the resistance of the firing circuit much more accurately than known systems.

Further, in accordance with this invention, a safing sensor is included and its resistance is included in the resistance monitored by the resistance measuring circuit.

Further, in accordance with this invention, the crash sensors may be connected in parallel. The crash sensors connected in parallel may be in separate housings to sense a crash at different locations in the automobile or they may be in the same housing to enhance the reliability of the package.

Further, in accordance with a fourth embodiment of this invention, two semiconductor switches are connected in series for control of the firing circuit. The second semiconductor switch in the series connection provides protection against a semiconductor failure that might inadvertently initiate deployment of an occupant protection system.

Further, in accordance with this invention, two wires to the crash sensor are used to complete the firing circuit and also to provide power to operate the semiconductor logic and to convey information of a failure in the firing circuit. This minimizes the cost and complexity of the vehicle wiring.

Further, in accordance with this invention, the crash sensor is isolated from vibrations perpendicular to the axis of the crash sensor thereby making it insensitive to cross axis vibrations.

A complete understanding of this invention may be obtained from the description that follows taken with the accompanying drawings.

THEORY OF AIR DAMPED CRASH SENSORS

The movement of air through an orifice can be laminar or turbulent. In the known air damped crash sensors the orifice is the gap between the ball and the tube. For the crash sensor to function as a velocity integrator the flow must be laminar which turns out to be what happens in ball and tube crash sensors of practical dimensions. The viscosity of the air which flows in the gap between the ball and the tube increases with temperature. For crash sensors exposed to the outside environment the total viscosity variation between temperature extremes is about twenty five percent. If the orifice dimension is unchanging with temperature, this viscosity variation causes a twenty five percent difference in the velocity changes required to operate the crash sensor at the temperature extremes. In the aforementioned known crash sensors to compensate for temperature variations the ball is made of a material having a lower expansion coefficient than the tube material so the orifice size increases at higher temperatures.

Consider in the known crash sensor the consequences of changing the size of the ball and the tube on the performance of the crash sensor, ignoring for now the effect of temperature changes. For each ball size the gap between the ball and tube and the travel to bridge the contacts must be specified. Many combinations of these three variables may be considered but a certain interrelationship leads to a particularly simple analysis that is presented in the following paragraphs.

Consider crash sensors of the known type having a range of ball sizes and with the travel inversely proportional to the ball size but the gap between the ball and tube constant and independent of ball size. The mass of the ball and therefore the force moving the ball during a crash is proportional to the third power of the diameter of the ball. For given and unchanging gap and pressure differential the mass flow rate of the gas from one side of the ball to the other is independent of the ball size. For example, for a smaller ball the decrease in mass flow rate caused by the reduced circumference of the gap is compensated by the increased mass flow rate per unit of gap length caused by reduced viscous forces caused by the reduced axial dimension of the gap. For a given acceleration, the pressure differential is proportional to the first power of the ball diameter. It follows from the linear relationship between pressure and mass flow rate and constant mass flow rate at constant pressure differential and gap for different ball sizes that the mass flow rate is proportional to the first power of the ball diameter for a given acceleration. Assuming that the air is not substantially expanded or compressed, which is a good approximation for most situations, from the fact that the area swept by the ball is proportional to the second power of its diameter and from the previously given reasoning that the mass flow rate of the gas is proportional to the first power of the ball diameter for a given acceleration it follows that the velocity of the ball in the tube for a given acceleration is inversely proportional to the diameter of the ball. It has been demonstrated in the above that for the cases under consideration limited to the travel being inversely proportional to the ball size and the gap between the ball and tube being constant and independent of ball size that the calibration or velocity change at which the crash sensor closes is unaffected by ball diameter.

The preceding analysis assumed a single temperature. For the different ball sizes and travels under consideration it follows from the above that for temperature compensation independent of the ball diameter the gap width must vary with temperature independently of the ball diameter. For this to happen the difference in the thermal expansion coefficients of the ball and the tube must be inversely proportional to the diameter of the ball.

A corollary of the conclusion of the preceding paragraph is that for a given pair of ball and tube materials and for the cases considered above there is a particular ball diameter that gives the best temperature compensation.

The above discussion has been limited to cases where the travel is inversely proportional to the diameter of the ball. This restriction is not realistic and it is appropriate to extend this discussion to cover different amounts of ball travel if it could be done in an appropriate manner. However, the analysis then requires numerical integration and gives results that are specific to the parameters under consideration. However, an examination of the integral that must be evaluated for each situation leads to the following useful approximation at constant flow rate: the pressure differential varies as the negative 2.5 power of the width of the gap. It follows from the nature of laminar flow that there is a linear relationship between pressure differential and the flow rate. Therefore the flow rate varies as the 2.5 power of the width of the gap at constant pressure differential.

The above analysis can be applied to a tenfold size reduction of the current production crash sensors. Current production crash sensors have a ball somewhat less than one half inch in diameter, an annular gap between the ball and the tube somewhat greater than one thousandth of an inch and a travel in the tube of about one tenth of an inch. As a first step, according the above, the ball diameter can be reduced by a factor of ten to about 0.040 inch and the travel increased by a factor of ten to about an inch with no change in the gap. Applying the 2.5 power rule to reducing the travel and noting that the 2.5 root of ten is about 2.5 it follows that reducing the gap from somewhat more than 0.001 inch to somewhat more than 0.0004 inches is required to restore the travel to the initial value of 0.1 inch.

For crash sensors of the known design the basis for compensation for changes in air viscosity with temperature is presented in the following. A difference between the temperature expansion coefficients of the ball and the tube of $2.5 \cdot 10^{-6}$ per degree F gives the required compensation in the aforementioned current production crash sensor. A tenfold decrease in the ball diameter dictates a tenfold increase in the differential temperature expansion coefficient to $25 \cdot 10^{-6}$. Reducing the gap by a factor of 2.5 to reduce the travel to be the value of the current production crash sensor dictates reduction of the differential by 2.5 also thereby giving a value of $10 \cdot 10^{-5}$ per degree F. Adding this to the temperature expansion coefficient of a ball which is near $6 \cdot 10^{-6}$ gives $16 \cdot 10^{-6}$ for the temperature expansion coefficient of the tube. This is in the range of values achievable with thermosetting and injection moldable plastics and leads to the practicability of using a plastic tube with a stainless steel ball for temperature compensation. Further, the gap between the ball and the tube expressed as a fraction of the diameter of the ball or the tube is larger by a factor of four when compared with current production crash sensors which makes it practicable to produce the tube to the required tolerances by molding. However, the diameter of the tube varies to some degree from unit to unit and it may be necessary to match balls to the actual diameters of the tubes.

The above analysis can be repeated for the case of a sixfold size reduction of the current production crash sensors. In the first step the ball diameter is reduced by a factor of six to about 0.073 inch and the travel increased by a factor of 6 to about 0.6 inch with no change in the gap. Applying the 2.5 power rule to reducing the travel and noting that the 2.5 root of six is about 2.0 it follows that reducing the gap from somewhat more than 0.001 to somewhat more than 0.0005 inches is required to restore the travel to the initial value of 0.1 inch.

The temperature expansion coefficients required if the ball and tube are to provide all of the compensation for changes in air viscosity with temperature are calculated in the following. A difference between the temperature expansion coefficients of the ball and the tube of $2.5.10^{-6}$ per degree F gives the required compensation in the aforementioned current production crash sensor. A sixfold decrease in the ball diameter dictates a sixfold increase in the differential temperature expansion coefficient to $15.10^{-6}$. Reducing the gap by a factor of 2.0 to reduce the travel to be the value of the current production crash sensor dictates reduction of the differential by 2.0 also thereby giving a value of $7.5.10^{-6}$ per degree F. Adding this to the temperature expansion coefficient of a ball which is near $6.10^{-6}$ gives $13.5.10^{-6}$ for the temperature expansion coefficient of the tube. This is approximately the thermal expansion coefficient of aluminum and leads to the practicability of using an aluminum tube with a stainless steel ball for temperature compensation.

Further, the gap between the ball and the tube expressed as a fraction of the diameter of the ball or the tube is larger by a factor of three when compared with current production crash sensors which makes it practicable to produce the tube to the required tolerances by any of several inexpensive processes such as die casting followed by ballizing or by drilling and reaming drawn rod. Again, the diameter of the tube should be expected to vary from unit to unit and it may be necessary to match balls to the actual diameters of the tubes.

The preceding analysis is necessarily approximate. The ball does not move on the axis of the tube during a crash. In fact, it is much more likely to be at the wall of the tube at any given time. Also, a difference between the temperature expansion coefficients of the ball and the tube of $2.5.10^{-6}$ per degree F may not be the best value to give the required compensation in the aforementioned current production crash sensor. For this and other reasons the preceding analysis must be considered as a general guide for approximating the required configuration. Final determination of the parameters for a crash sensor must be done by using a computer model into which actual crash data are entered or by making repeated trials until the desired performance is achieved.

The preceding analysis has been devoted to analyzing crash sensors in which the only path for air displaced when the ball moves is through the gap between the ball and the tube and in which the only compensation for variation of the viscosity of air with temperature is by choosing the thermal expansion coefficients of the materials used for the ball and tube. Consider a crash sensor with the same ball size and travel as a crash sensor of the type previously discussed in which there is a second path for viscous flow of the air and suppose, for example, that two thirds of the air is to flow through the second path and only one third is to flow between the ball and the tube. For this case according to the 2.5 power rule the gap between the ball and the tube must be reduced to about 64 percent of what it would be if all the air were routed between the ball and the tube. This leads to several significant advantages. Firstly, the tolerance in the manufacture of the tube can be relaxed considerably because the size of the gap is not the primary determinant of the crash sensor calibration. Secondly, it becomes much less significant whether the ball moves in the center of the tube or along the wall. Thirdly, as will be discussed in the description of the invention, fine adjustments in the calibration of the crash sensor can be made during assembly of the parts thereby further relaxing the requirement for accurate manufacture of the plastic or aluminum tube. And, fourthly, having a second path for the air expands the choice of materials for the tube. It becomes possible to select from materials having a wide range of thermal expansion coefficients to obtain compensation for variation of air viscosity with temperature because the required difference in the thermal expansion coefficient between the ball and the tube becomes a function of the fraction of the air that bypasses the gap between the ball and the tube.

One way to create a second path for air flow is to make flutes in the outer cylindrical surface of the tube and place this tube into a second tube which it closely fits. In this construction the length of the resulting air channel is many times longer than the effective axial length of the gap between the ball and the tube. For example, the length of the flutes might be ten times the effective axial length of the gap between the ball and the tube. The viscous resistance to air flow is proportional to the length of the channel so that the smaller dimension of the flutes can be larger than the gap between the ball and the tube. In the extreme case where the flutes are very wide to give the equivalent of two tubes with a gap between them the pressure drop varies as the minus third power of the gap between the tubes so that the depth of a flute would be larger than the effective gap between the ball and the tube by the cube root of ten or about twice the gap. Additionally, the channels created by the flutes may extend over only a small fraction of the circumference of the tube thereby the depth of the flutes may be increased by another factor of approximately four. The above analysis gives dimensions for the flutes of the order of four thousandths of an inch in a crash sensor having a ball about one millimeter in diameter which is well within the capability of the plastic molding art. For a crash sensor having a ball about two millimeters in diameter the above analysis gives flutes having a depth of the order of five thousandths of an inch which is within the capability of both the aluminum die casting art and the aluminum drawing art.

One way to achieve temperature compensation when the air gap comprises flutes in the outer cylindrical surface of the tube is to make the tube incorporating the flutes and the second tube of materials having different thermal expansion coefficients.

The flutes may also be placed on the inside diameter of the tube so that the ball forms one side of each channel. In this configuration the advantages of the greater air path length are not achieved. If this were done in crash sensors having ball dimensions similar to the dimensions of the production crash sensors the air flow through the shorter channels would not be viscous and the desired performance would not be achieved. However, in the crash sensors having very small balls the flow is viscous. In crash sensors of this design temperature compensation may be achieved by making the ball of metal and making the tube of a material such as plastic having a much larger thermal expansion coefficient than that of the ball. As in the case of the crash sensor with flutes on the outer diameter of the tube a much greater latitude in the choice of materials is achieved by channeling the air through flutes compared with crash sensors channeling the air between the ball and the tube.

Copending U.S. patent application Ser. No. 166,044 titled *Mechanical Crash Sensing Switch With Latching In The Closed Position* teaches that it is also possible to compensate for temperature variations of air viscosity by varying the normal resting position of the movable mass so that compensation is achieved by requiring the mass to travel farther at lower temperatures before bridging the contacts and less far at higher temperatures.

Heretofore seven significant factors have not been recognized in the technology of crash sensors having a viscously damped moving element. Firstly, it has not been recognized that reducing the size of the ball and tube leads to requirements for thermal expansion coefficients that can be met by inexpensive parts made of thermosetting plastic or aluminum in crash sensors of the type that depend on different thermal expansion coefficients in the ball and tube for all of the compensation for variation of air viscosity with temperature. Secondly, it has not been recognized that reducing the size of the ball and the tube by a large factor substantially increases the size of the gap relative to the size of the parts and that therefore the relative production tolerances are substantially easier to satisfy for the parts of greatly reduced size than for current production parts which further enhances the viability of a plastic or aluminum tube. Thirdly, it has not been recognized that production tolerances can be relaxed even further by routing the air through channels rather than between the ball and the tube. Fourthly, it has not been recognized that channels to bypass the gap between the ball and the tube can be easily made by molding processes or by forming flutes in drawn aluminum rod and that the crash sensor can be calibrated by selectively blocking a fraction of the channels during assembly of the crash sensor. Fifthly, it has not been recognized that routing part of the air through channels rather than between the ball and the tube enables use of a wider range of materials for the tube. Sixthly, it has not been recognized that the combination of a small ball with a semiconductor switch enables the use of a much smaller ball and tube because the requirements for contact dwell and resistance are substantially reduced. Seventhly, it has not been recognized that flutes on the inside diameter of the tube will combine with the outer surface of the ball to form channels that will conduct air viscously when the diameter of the ball is sufficiently small.

DESCRIPTION OF THE DRAWINGS

FIG. 14 shows in cross section part of the crash sensor of the invention with a tube having flutes forming channels that vary in size with temperature.

FIG. 15 shows a sectional view of the tube and housing taken along lines 15—15 of FIG. 14.

BEST MODE FOR CARRYING OUT THE INVENTION

Figure 1:
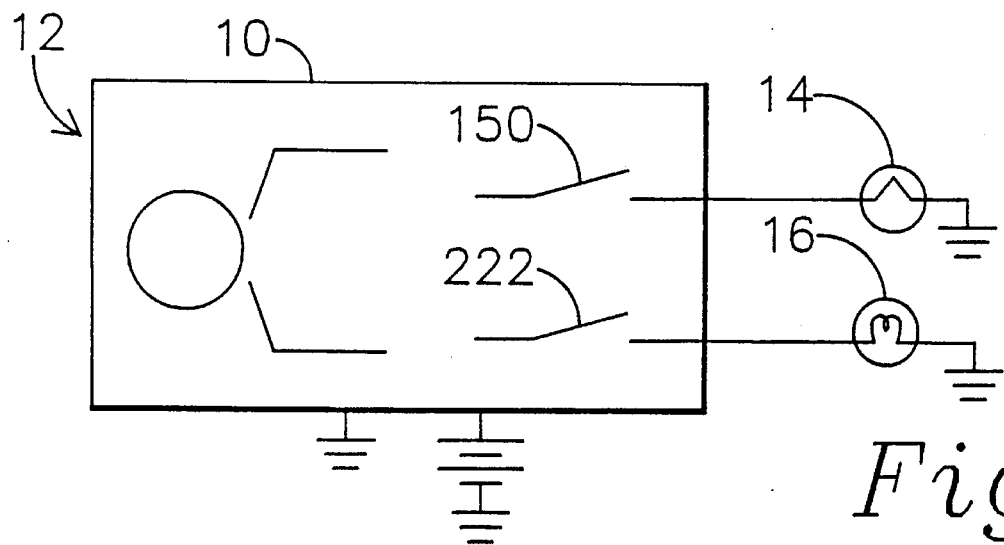
FIG. 1 shows a schematic diagram of the crash sensor and diagnostic system of the invention and shows the squib for initiating the pyrotechnic reaction and also shows the operator warning light.
Figure 2:
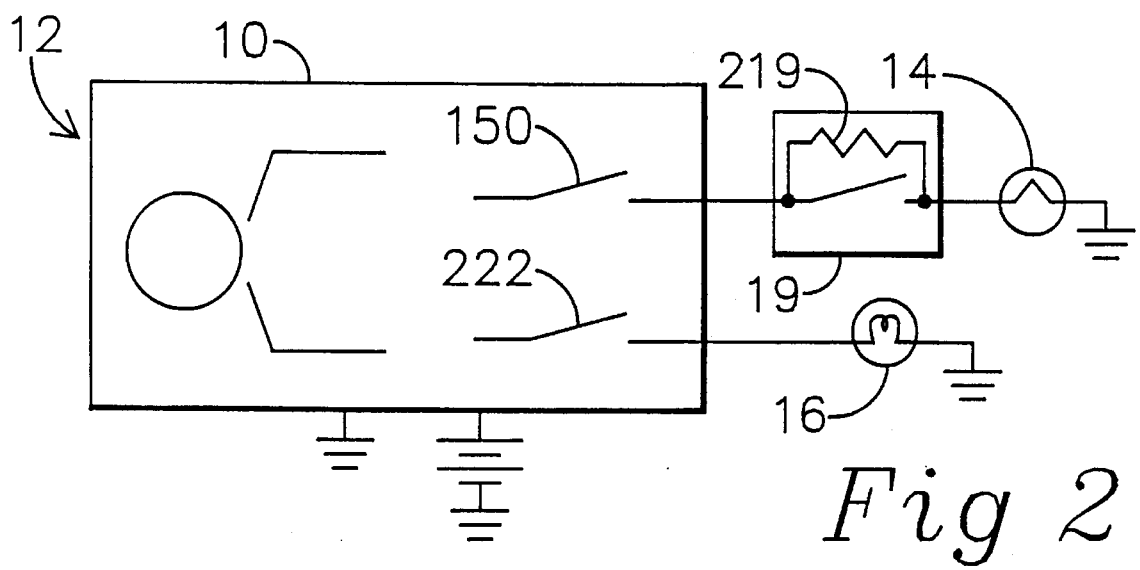
FIG. 2 shows a schematic diagram of the crash sensor and diagnostic system of the invention in a vehicle having a safing sensor with a diagnostic resistor.

Referring now to the drawings, an illustrative embodiment of the invention is shown in a crash sensor and diagnostic system. Referring particularly to FIGS. 1 and 2, the crash sensor and diagnostic system 10 comprises a crash sensor 12 for sensing an acceleration pulse indicative of a crash and a semiconductor switch 150 for closing and providing power to an occupant protection device illustrated as squib 14 upon sensing a crash. It also comprises diagnostic circuitry for detecting a defective firing circuit and a flip flop 222 illustrated as a switch 222 for closing and providing power to an operator warning light 16 upon sensing a defective firing circuit. The firing circuit is the circuit external to the crash sensor and diagnostic system 10 that is energized to initiate deployment of the occupant protection systems. In FIG. 1 the firing circuit consists of the conductor to squib 14, squib 14, and the ground connection that completes the circuit through squib 14. In FIG. 2 the firing circuit also includes the safing sensor 19. Upon sensing a crash the semiconductor switch 150 closes and remains closed to initiate operation of the occupant protection apparatus. Upon sensing a failure in the firing circuit flip flop 222 illustrated as a switch 222 closes to turn on warning light 16 to warn the vehicle operator. FIG. 2 also includes a safing sensor 19 electrically located where it must be closed for current to reach squib 14. Sating sensor 19 includes a fusible diagnostic resistor 219.

Figure 3:
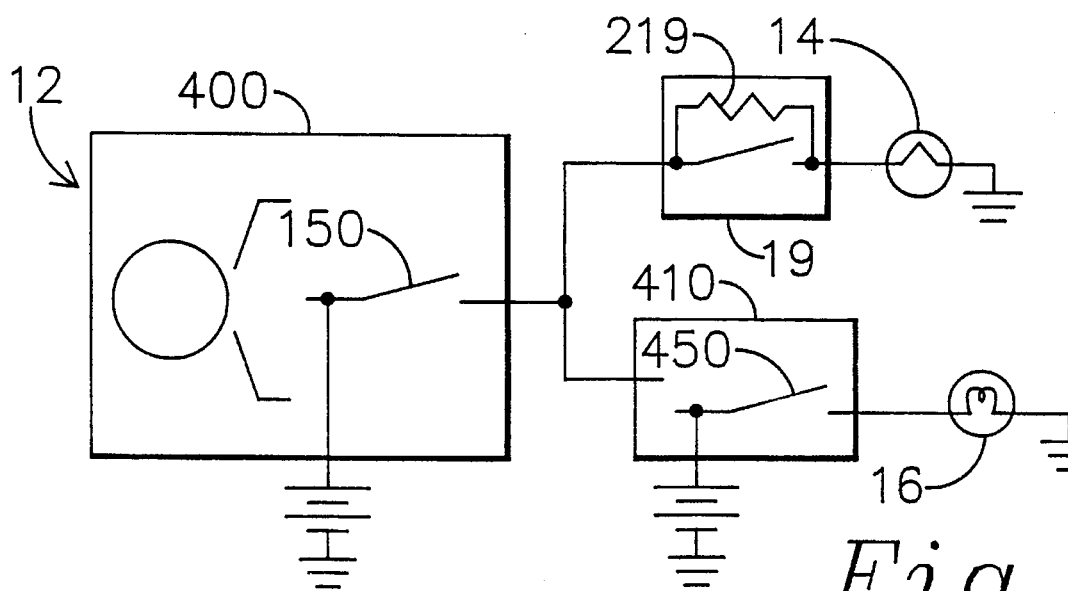
FIG. 3 shows a schematic diagram of an embodiment of the crash sensor and diagnostic system of the invention that requires only two wires to each crash sensor and diagnostic unit.

Referring particularly to FIG. 3, the crash sensor and diagnostic system 400 comprises a crash sensor 12 for sensing an acceleration pulse indicative of a crash and a semiconductor switch 150 for closing and providing power to an occupant protection device illustrated as squib 14 upon sensing a crash. It also comprises diagnostic circuitry for detecting a defective firing circuit and transmitting information about the condition of the firing circuit through the conductors of the firing circuit. The firing circuit of FIG. 3 is the circuit external to the crash sensor and diagnostic system 400 that is energized to initiate deployment of the occupant protection systems. The firing circuit consists of the conductor to squib 14, squib 14, and the ground connection that completes the circuit through squib 14. The firing circuit may also include the safing sensor 19 with fusible resistor 219. Diagnostic module 410 receives the information transmitted through the conductors of the firing circuit and turns on warning light 16 to warn the vehicle operator upon receipt of information that there is a firing circuit defect. The absence of information indicates a firing circuit error and therefore also causes diagnostic module 410 to turn on operator warning light 16.

It will be appreciated as the description proceeds that the invention may be implemented in different embodiments.

The invention excluding the electronic circuit will now be described with reference to FIGS. 4 through 7, 14, 15, 16, and 17.

Referring now to FIGS. 4 through 7, 14, 15, 16, and 17; the crash sensor 12 comprises a ball 20 with a gold plated exterior surface for bridging two electrical contacts 32 and 34. Ball 20 moves in cavity 22 of tube 24, 124, or housing 224 between a normal resting position and semiconductor chip 42. Semiconductor chip 42 is bonded to base 44. In the embodiment illustrated in FIGS. 4 and 5 tube 24 and bimetallic washer 28 fit in cavity 46 of housing 48 and ball 20 has a normal resting position against inwardly extending fingers 26 of bimetallic washer 28. In the embodiment illustrated in FIGS. 14, 15, and 16 tube 124 fits into cavity 146 of housing 148. In the embodiment illustrated in FIG. 17 the tube and housing have been combined into housing 224. In the embodiments illustrated in FIGS. 14, 15, and 16 the normal resting position of the ball is against the inner surface 96 of housing 48. In the embodiment illustrated in FIG. 17 the normal resting position of the ball is against the end of the cavity (not illustrated) of housing 224.

Figure 16:
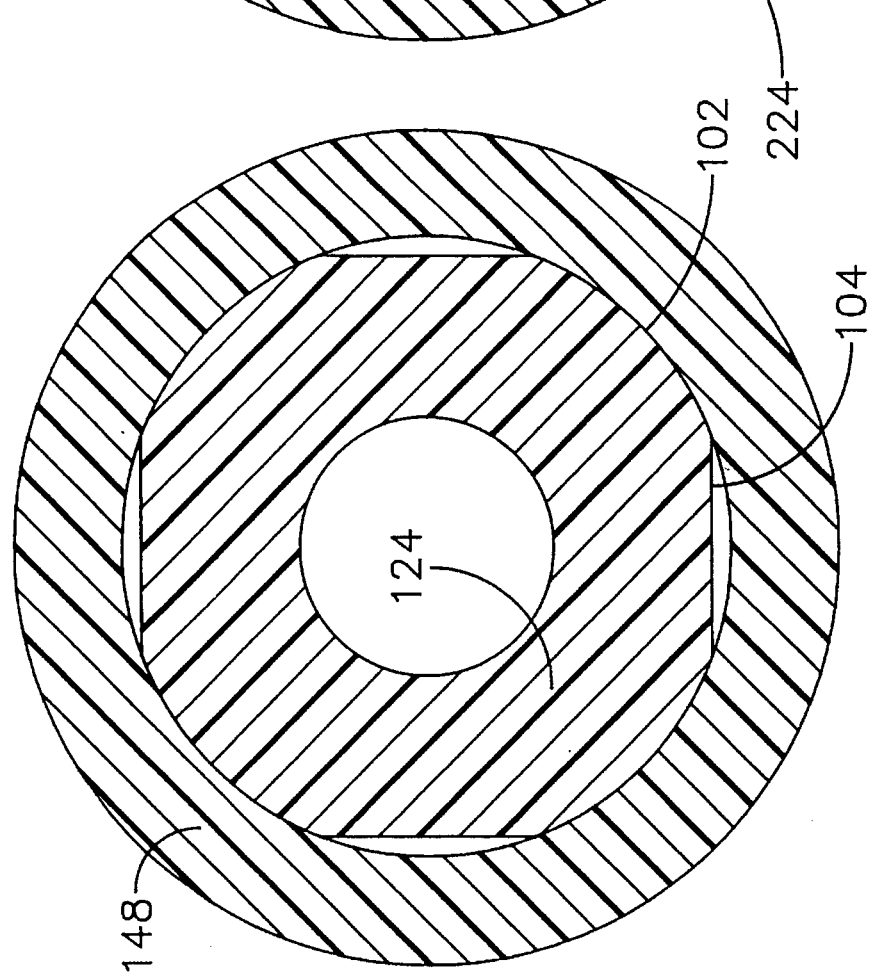
FIG. 16 shows a sectional view of the tube and housing taken along lines 16—16 of FIG. 14.

Cavity 22 is divided into chambers 21 and 23 by ball 20, and tube 24, 124, or housing 224. Housings 48, 148, and 224 are preferably made of injection molded plastic. Tubes 24 and 124 have flutes on their outer circumferences and on one end which create air channels 66 and 166 respectively through which air flows viscously when the ball 20 moves. Housing 224 has flutes on its inner circumference which create air channels 266 through which air flows viscously when the ball 20 moves. Tube 24 is held in place in cavity 46 by adhesive 52 applied at a sufficient number of places to insure retention of tube 24. A second purpose of adhesive 52 is for calibration of the crash sensor. The adhesive 52 can be used to close a number of the channels 66 to accurately determine the resistance to the flow of air from chamber 21 to chamber 23. This is accomplished during manufacture following the insertion of tube 24 into cavity 46 by inserting a ball of precisely known diameter through which an air duct has been drilled into the tube 24 and pressurizing chamber 23 while measuring the flow rate and adding adhesive 52 around the circumference of tube 24 to give the desired flow rate. Alternatively, as illustrated in FIGS. 14, 15, and 16 tube 124 may be held in place in cavity 146 by a retaining ring 86 residing in a groove 88 in housing 148. Radial positioning of cylinder 124 with respect to housing 148 is fixed at the bottom of cavity 146 by lip 98 which has a slightly reduced inner diameter for snugly holding cylinder 124. At the top of cavity 146 lip 102 on cylinder 124 fits snugly in housing 148 as illustrated in FIG. 16. Flats 104 on cylinder 124 allow air going through channels 166 to pass lip 102. In the embodiment illustrated in FIGS. 14, 15, and 16 housing 148 is made of material having a higher coefficient of expansion with temperature than tube 124 and bimetallic washer 28 with its inwardly extending fingers 26 has been omitted. Openings 92 in retaining ring 86 allow free passage of air to the channels 166.

Figure 17:
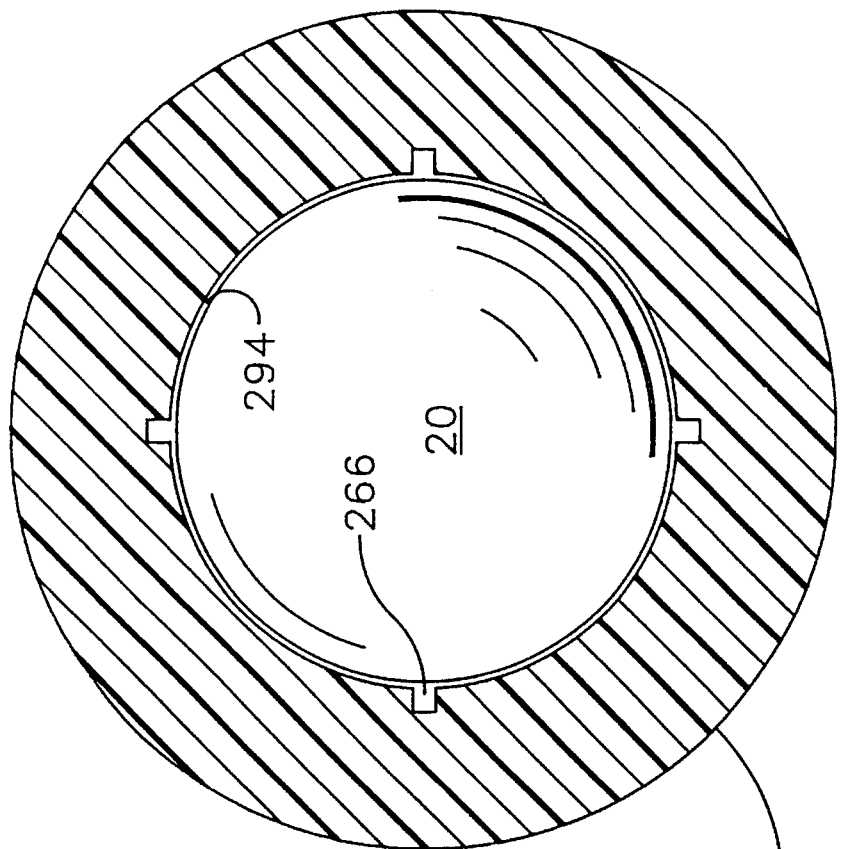
FIG. 17 shows a ball with a sectional view of a tube of the invention having flutes on its inner diameter.

In the embodiment illustrated in FIG. 17 housing 224 is made of a material having a thermal expansion coefficient sufficiently greater than the thermal expansion coefficient of ball 20 that the dimensions of channels 266 change with temperature to compensate for the variation of air viscosity with temperature.

Contact 32 is a gold wire bonded at point 36 to a pad (not shown) on semiconductor chip 42 by any suitable method. One method is ultrasonic welding. Contact 34 is bonded at point 38 to a pad (not shown) on semiconductor chip 42.

Figure 6:
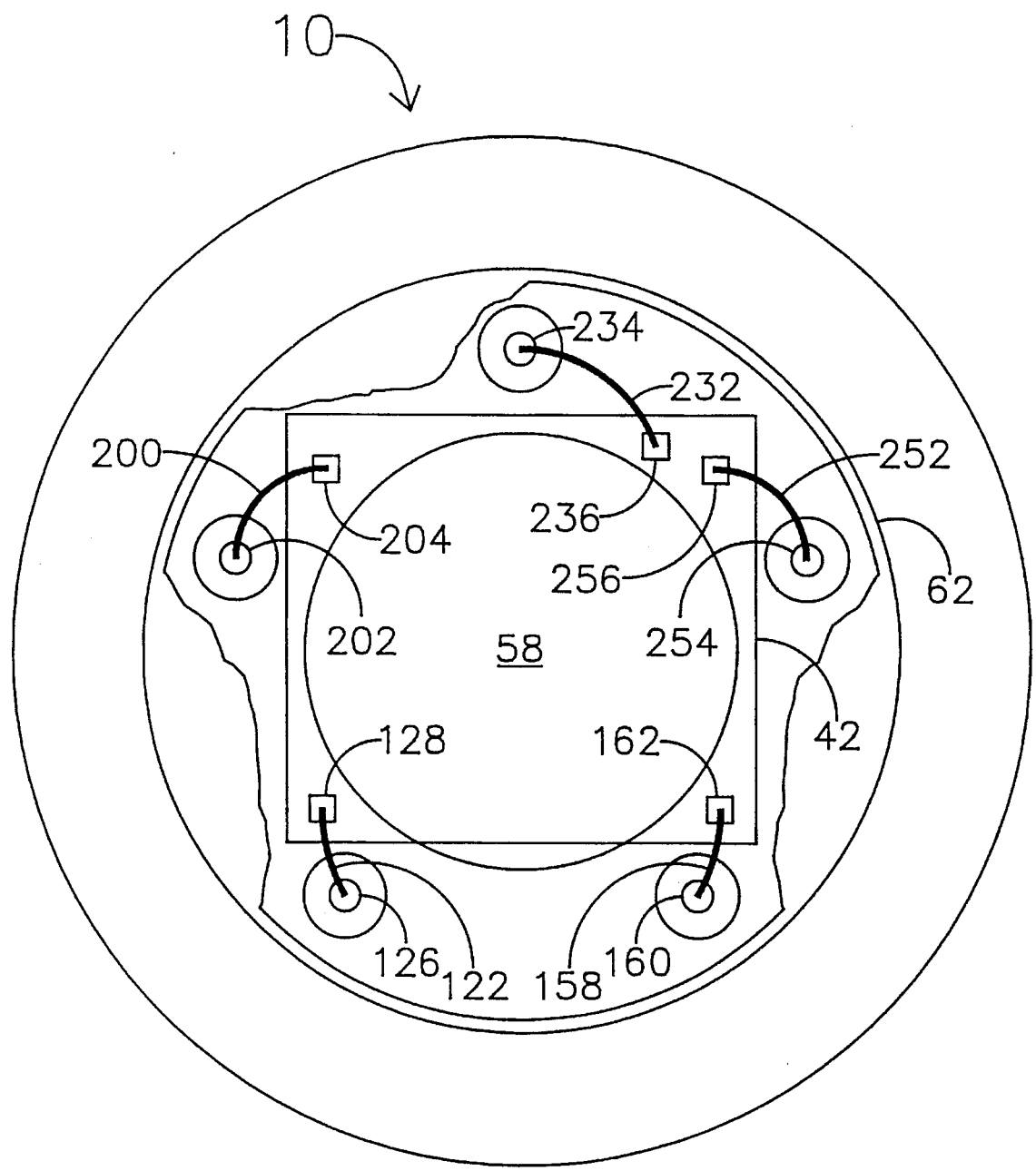
FIG. 6 shows a top view of the crash sensor illustrated in FIGS. 4 and partially cut away to indicate locations of certain of the components.

One end of housings 48, 148, and 224 abuts semiconductor chip 42. A small amount of adhesive holds the housing in position on semiconductor chip 42 particularly during assembly. Magnet 54 is positioned by stem 56 of the housing. The base of ferromagnetic cup 58 abuts magnet 54. Annular ring 29 on the housings resiliently flexes and accommodates production tolerances in the diameters of the housings and ferromagnetic cup 58. The terminals 126, 160, 202, 234, and 254 are connected respectively to pads 128, 162, 204, 236, and 256 on semiconductor chip 42 by conductors 122, 158, 200, 232, and 252. Refer to FIG. 6 for an illustration of the terminals, pads, and conductors. In another embodiment of the invention there are only three terminals on the housing. In this embodiment there would be only three terminals and three pads but it would otherwise be similar to the system illustrated in FIG. 6. The cover 62 with annular elastomeric cushion 64 is placed over the completed assembly and attached by solder or other means at flange 68 to base 44 to make a hermetically sealed unit. The invention is illustrated in a package resembling the standard TO-205AD package commonly used for low power transistors. Any other suitable semiconductor encapsulation method could be used. In another common semiconductor encapsulation method base 44 is made of plastic and thermosetting resin is applied to the entire assembly to form cover 62. It should be noted that the time during which current is carried is so brief that there is no need for heat sinking capability in the semiconductor mounting.

Magnet 54 is adapted to attract ball 20 toward itself with a force more than sufficient to hold ball 20 against inwardly extending fingers 26 of bimetallic washer 28 during normal operation of the vehicle. Ferromagnetic cup 58 conducts the flux from magnet 54 thereby making the magnetic force on ball 20 less dependent on the position of the ball and making more efficient use of magnet 54.

Figure 7:
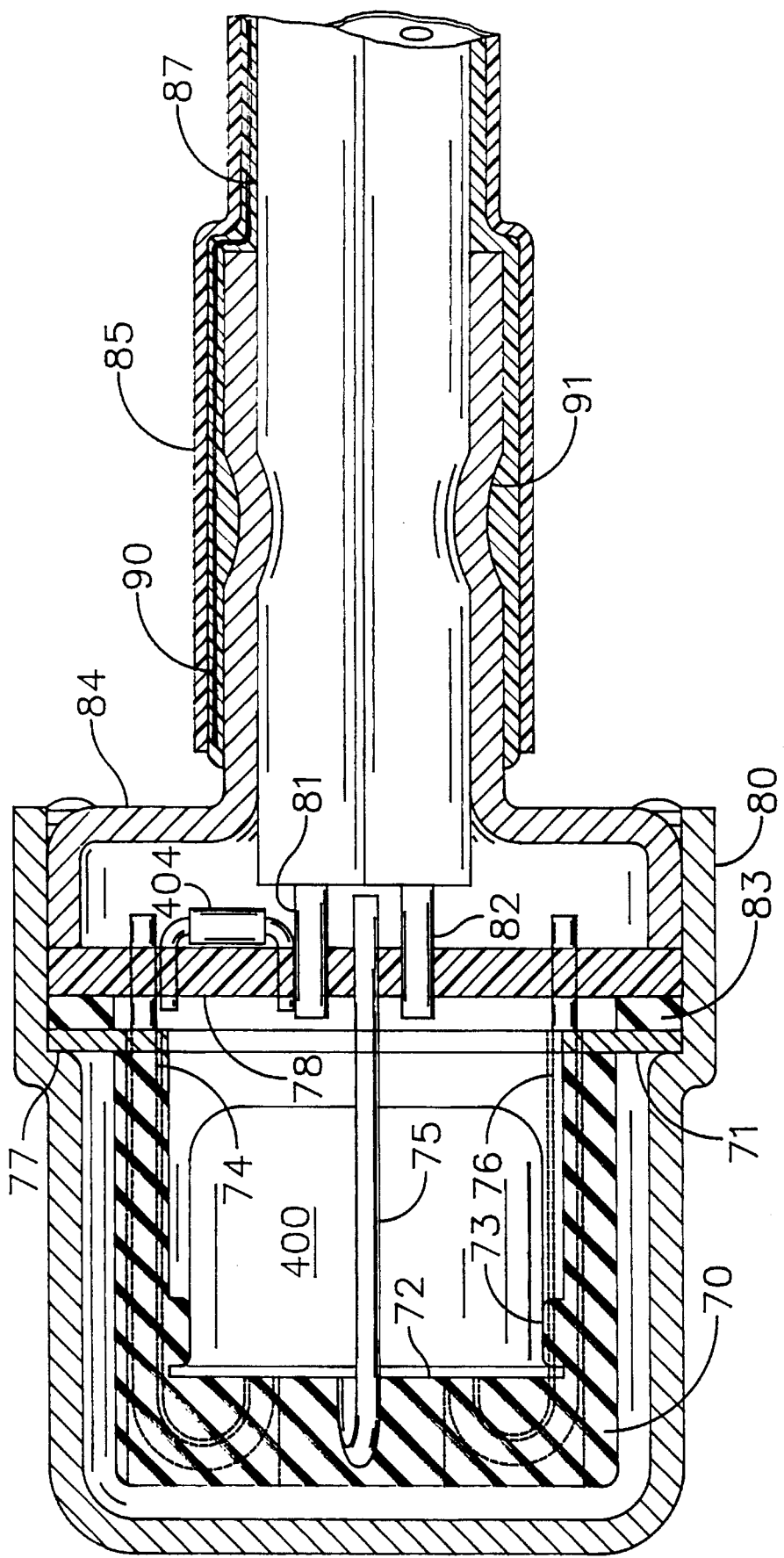
FIG. 7 shows partially cut away a crash sensor and diagnostic system of the invention mounted in a resilient support for reducing sensitivity to cross axis vibrations.

Referring now to FIG. 7, the crash sensor and diagnostic system 400 is mounted on a resilient support to isolate the crash sensor from vibrations. The crash sensor and resilient support are enclosed in a weatherproof outer enclosure. The resilient support allows the crash sensor and diagnostic system limited movement within the outer enclosure in a plane perpendicular to the axis of its tube. The crash sensor and diagnostic system illustrated is an embodiment requiring only two wires to the vehicle electrical system. A crash sensor and diagnostic system requiring only two wires is described hereinafter with reference to the schematic diagram of FIG. 11. The resilient support comprises a cup shaped resilient support 70 made of a material such as rubber preferably bonded to washer 71 during the molding process. The crash sensor and diagnostic system 400 is seated against the bottom 72 of the resilient support 70 and is retained by lip 73. Channels are provided in the resilient support 70 and washer 71 for lead wires 74, 75, and 76. The washer 71 is seated on ledge 77 of outer enclosure can 80 and is positioned thereby. Printed circuit board 78 supports capacitor 404 and connects lead wires 74 and 76 with harness wires 81 and 82. Printed circuit board 78 also connects lead wires 74 and 75 with the terminals of capacitor 404. Because of the small number of connections it may be preferable to omit printed circuit board 78 and directly connect the components by a process such as acoustic welding. A spacer such as resilient washer 83 preferably formed in the same molding process as resilient support 70 may be included between washer 71 and printed circuit board 78. Cap 84 completes the outer enclosure and is attached by welding or other suitable means at its outer circumference to provide a weatherproof seal. An elastic wrapper 85 preferably made by shrinking heat shrinkable material lined with a meltable material 87 provides a weatherproof seal at the entrance of wires 81 and 82 to cap 84. Filaments 90 give the wrapper longitudinal strength enabling it to also function as a strain relief. Strain relief may also be accomplished by crimping 91 of the smaller diameter portion of cap 84 around the wires 81 and 82.

The electronic circuit of the invention will now be described with reference to FIG. 8. Contact 32 is connected with the trigger input of monostable multivibrator 120 and contact 34 is connected through conductor 122 and terminal 126 with the positive voltage side of the vehicle electrical system. Monostable multivibrator 120 is adapted to have a normally low output signal except that after application of battery voltage to its trigger input its output goes to logic high and remains there for about one second. Signal generator 130 is adapted to generate a square wave output at a frequency of one cycle per second. It is preferably an oscillator operating at a frequency such as 16384 hertz or one megahertz and a binary scaler to reduce the frequency of the oscillator. For a predetermined number of cycles each second it provides a logic high signal at its output. If a logic high inhibit signal is received through conductor 168 the logic high output signal of 1.0 hertz signal generator 130 is delayed for sufficient time to allow another crash sensor and diagnostic system to complete a diagnostic test. Its output is supplied through conductor 136 to one input of logical OR circuit 140. The output of monostable multivibrator 120 is supplied through conductor 138 to the other input of logical OR circuit 140. The output of logical OR circuit 140 is at logic high at times when it is required to supply vehicle power to the squibs 14 of the occupant protection systems.

Figure 8:
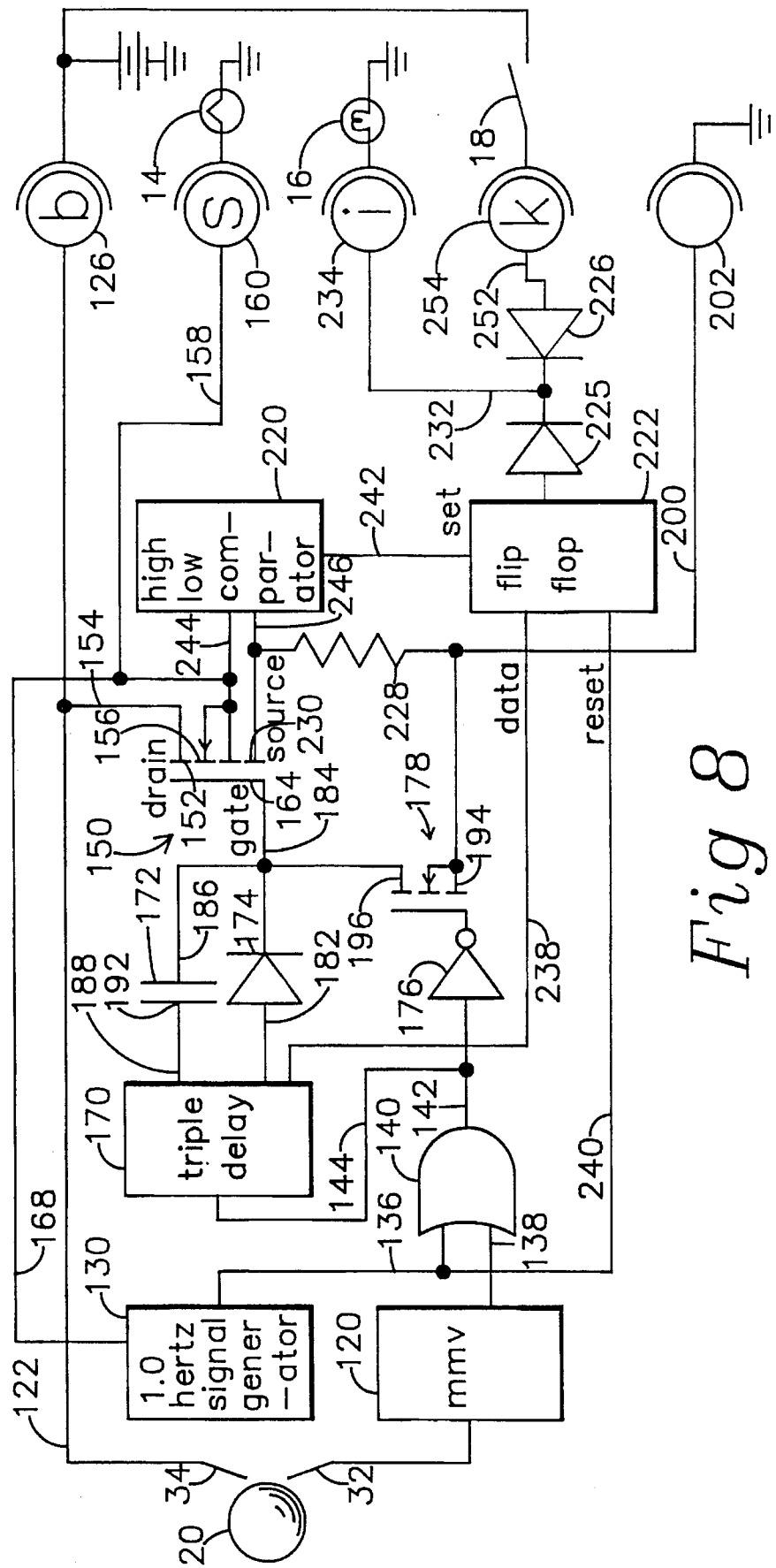
FIG. 8 shows a schematic diagram of the circuit of the invention.

Semiconductor switch 150 is illustrated in FIG. 8 as a Sensefet MOS power transistor. The drain electrode 152 of the Senselet is connected through conductors 154 and 122 and terminal 126 with the positive voltage side of the vehicle electrical system. The source electrode 156 of semiconductor switch 150 is connected through conductor 158 and terminal 160 with the squibs 14 of the occupant protection systems. Semiconductor switch 150 is controlled by the signal at its gate electrode 164. It is adapted to be fully closed when the signal at gate electrode 164 is about ten volts higher than the signal at source electrode 156 and to be fully open when the signal at gate electrode 164 is about the same voltage as the signal at source electrode 156.

The circuit to drive semiconductor switch 150 comprises triple delay circuit 170, capacitor 172, diode 174, inverter 176 and switching transistor 178 together operating as a voltage doubler. A voltage doubler circuit was selected because it offers the potential for implementation on a single semiconductor circuit. All the components of the drive circuit except capacitor 172 are formed on semiconductor chip 42. Capacitor 172 is preferably a small ceramic capacitor and may be bonded directly to pads (not illustrated) on semiconductor chip 42 or may be located elsewhere.

The circuit to drive semiconductor switch 150 provides the required voltage levels at the gate electrode 164 in accordance with the output signal of logical OR circuit 140. When the output of logical OR circuit 140 is at logic low the voltage at gate electrode 164 of semiconductor switch 150 is about the same as the voltage at source electrode 156. When the output of logical OR circuit 140 is at logic high the voltage at gate electrode 164 is about twelve volts greater than the voltage at source electrode 156. The circuit to provide drive to semiconductor switch 150 in accordance with the output of logical OR circuit 140 is described in the following paragraph.

Triple delay circuit 170 responds to a logic high signal supplied to its input through conductor 144 by supplying three delayed logic high signals at its three outputs. Each of the outputs is delayed differently. The signal with the smallest delay is supplied through conductor 182 to the anode of diode 174. The signal from the cathode of diode 174 is applied through conductor 184 to terminal 186 of capacitor 172 and is also connected through conductor 184 with gate electrode 164 of semiconductor switch 150. The signal with the intermediate delay is applied through conductor 188 to terminal 192 of capacitor 172. The undelayed output of logical OR circuit 140 is applied through conductor 142 to the input of inverter 176. The output of inverter 176 is applied to the gate of switching transistor 178 and controls whether it is conducting or not. When the output of inverter 176 is at logic high switching transistor 178 conducts and when the output of inverter 176 is at logic low switching transistor 178 does not conduct. The source electrode 194 of switching transistor 178 is connected through conductor 200 and terminal 202 with the ground side of the vehicle electrical system. The drain electrode 196 of switching transistor 178 is connected through conductor 184 with gate electrode 164 of semiconductor switch 150.

The circuit comprising high-low comparator 220, flip-flop 222, diode 225, diode 226, and resistor 228 utilizes the voltage at the sense electrode 230 of semiconductor switch 150, the voltage at the source electrode 156 of semiconductor switch 150, the most delayed signal from triple delay circuit 170 and the output signal of 1.0 hertz signal generator 130 to monitor the resistance of the firing circuit and control operator warning light 16 through conductor 232 and terminal 234. The most delayed signal from triple delay circuit 170 is supplied through conductor 238 to the data input of flip-flop 222. The voltage of the firing circuit is supplied through conductor 168 to the inhibit input of the 1.0 hertz signal generator 130. The 1.0 hertz output of signal generator 130 is supplied through conductor 240 to the reset input of flip-flop 222. The output of high-low comparator 220 is supplied through conductor 242 to the set input of flip-flop 222. The output of flip-flop 222 goes to logic high and remains there when the set and data signals are simultaneously at logic high and goes to and remains at logic low when the reset signal goes from low to high. The output of high-low comparator 220 is at logic high when the input signals received through conductors 244 and 246 differ by more than a predetermined amount. Internally, semiconductor switch 150 is a MOSFET power transistor in which a few of the source cells have been electrically isolated from the preponderance of the source cells and connected to a separate external terminal labeled 230 in FIG. 8. Semiconductor switch 150 functions while it is in its on state as the two upper elements of a resistance bridge. The two lower elements of the bridge are the firing circuit and resistor 228. The value of resistor 228 is determined so that the voltage on conductor 246 will equal the voltage on conductor 244 when the resistance of the firing circuit is a nominal value and semiconductor switch 150 is conducting. The output of flip-flop 222 is supplied through diode 225, conductor 232, and terminal 234 to the operator warning light 16.

Terminal 254, conductor 252, and diode 226 provide power to the operator warning light 16 through conductor 232 and terminal 234 when the driver turns the ignition switch 18 of the vehicle to the start position. Diodes 225 and 226 keep the signals from the ignition switch and from the flip-flop 222 from interfering respectively with the output circuit of flip-flop 222 and the circuit energized by the ignition switch.

Figure 9:
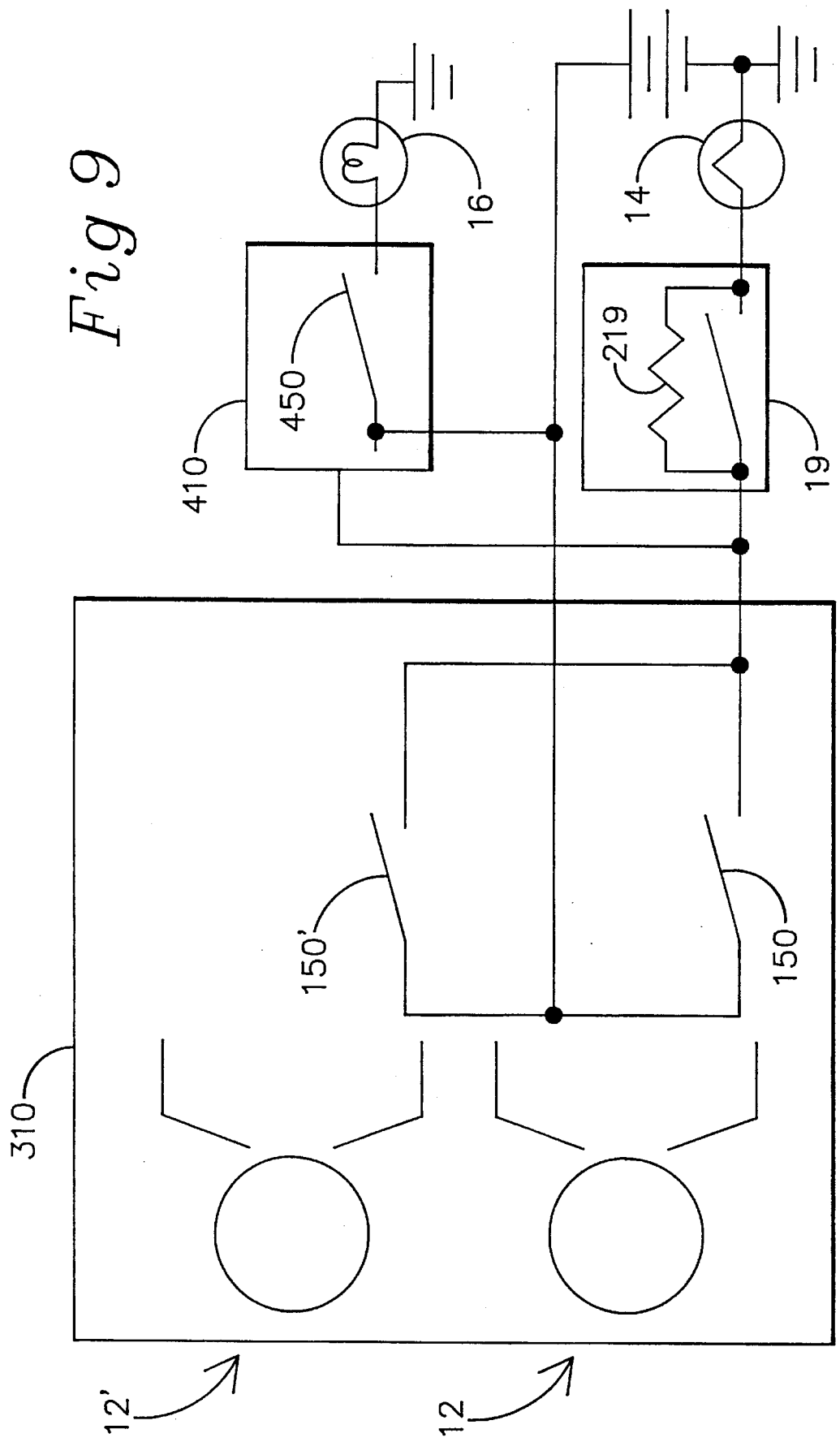
FIG. 9 shows two crash sensors of the invention placed in the same housing.

The embodiment of the invention in which two crash sensors are combined in parallel will now be described with reference to FIG. 9. The crash sensor and diagnostic system 310 comprises two crash sensors 12 and 12' for sensing an acceleration pulse indicative of a crash each having a semiconductor switch 150 or 150' respectively for closing and providing power to an occupant protection device illustrated as squib 14 upon sensing a crash. For each crash sensor there is also diagnostic circuitry for detecting a defective firing circuit and transmitting on the conductors of the firing circuit an indication of the condition of the firing circuit to diagnostic module 410. Diagnostic module 410 responds to information that there is a defect in the firing circuit by closing switch 450 to turn on operator warning light 16 on the dashboard of the vehicle. The firing circuit may also include safing sensor 19. Upon sensing a crash the semiconductor switches 150 and 150' close and remain closed to initiate operation of the occupant protection apparatus. For diagnostic purposes semiconductor switches 150 and 150' are closed periodically to briefly apply power to the firing circuit. Upon sensing a failure in the firing circuit the crash sensor and diagnostic system 310 changes the timing of the firing circuit tests to inform diagnostic module 410 of the failure. Upon sensing a change in the timing of the test pulses switch 450 is closed to turn on warning light 16 to warn the vehicle operator. Sating sensor 19 may also be included and if so it is electrically located where it must be closed for current to reach squib 14. Sating sensor 19 includes a diagnostic resistance 219.

Figure 10:
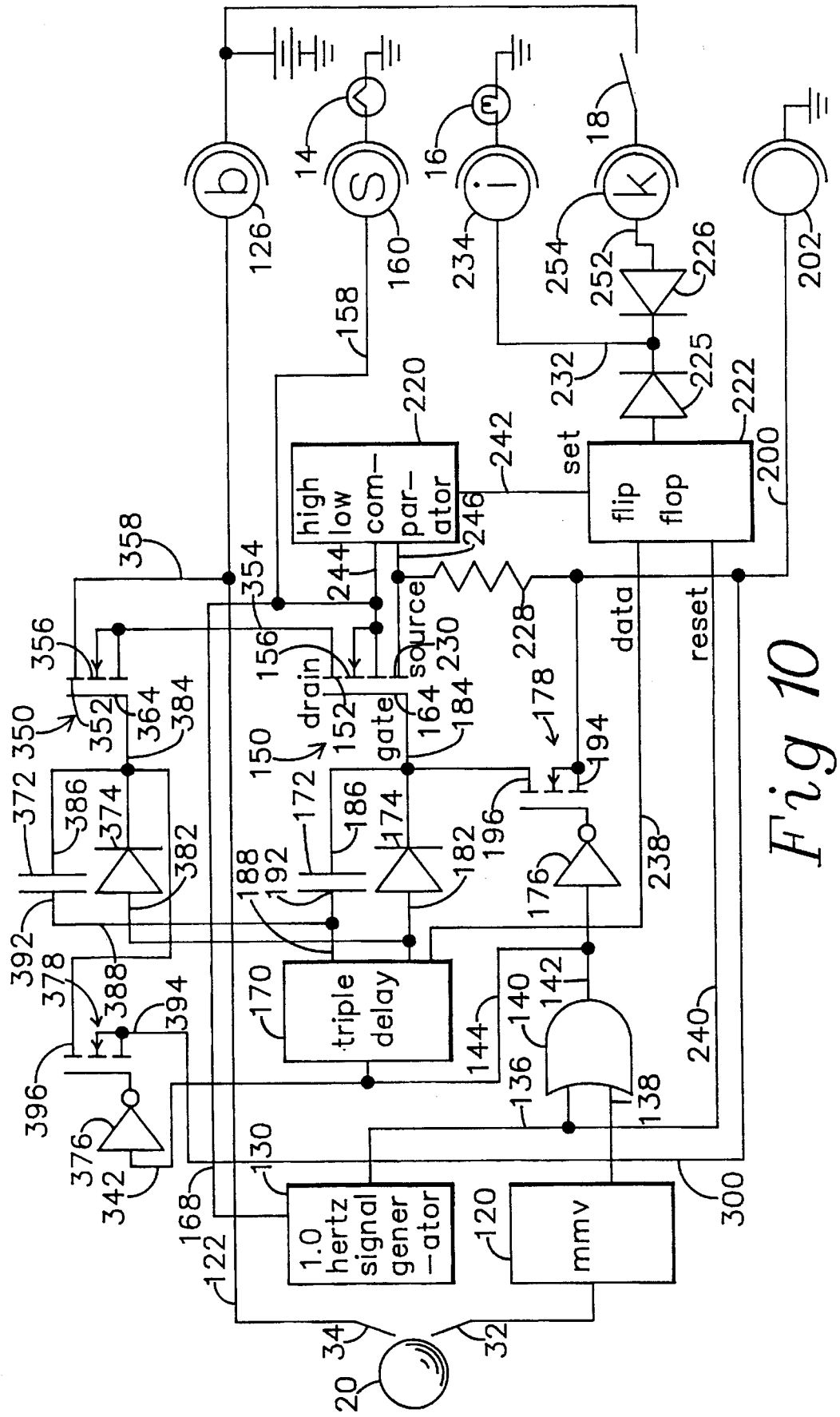
FIG. 10 shows the same schematic diagram as FIG. 7 but with an additional switch and related components.

A second embodiment of the electronic circuit of the invention will now be described with reference to FIG. 10. The circuit of FIG. 10 is the same as the circuit of FIG. 8 except that semiconductor switch 150 is replaced by two semiconductor switches 150 and 350 in series for greater reliability. Certain other components required for driving semiconductor switch 350 are also duplicated to achieve greater reliability. Certain other components have not been duplicated in the circuit of FIG. 10 and assist in the driving of both semiconductor switch 150 and semiconductor switch 350. It will be obvious to those skilled in the art that there are many different ways that the components used to drive semiconductor switch 150 can be shared with semiconductor switch 350. In particular it is possible and may be desirable to duplicate all components back to and including the contacts 32 and 34 which sense the position of the ball 20.

Semiconductor switch 350 is illustrated in FIG. 10 as a MOSFET switching power transistor. The source electrode 356 of semiconductor switch 350 is connected through conductor 354 with the drain electrode 152 of semiconductor switch 150. The other electrodes of semiconductor switch 150 are connected as described hereinabove with reference to FIG. 8. The drain electrode 352 of semiconductor switch 350 is connected through conductors 358 and 122 and terminal 126 with the positive voltage side of the vehicle electrical system. Semiconductor switch 350 is controlled by the signal at its gate electrode 364. It is adapted to be fully closed widen the signal at gate electrode 364 is about ten volts higher than the signal at source electrode 356 and to be fully open when the signal at gate electrode 364 is about the same voltage as the signal at source electrode 356.

The circuit to drive semiconductor switch 350 comprises logical OR circuit 140, triple delay circuit 170, capacitor 372, diode 374, inverter 376 and switching transistor 378 together operating as a voltage doubler. Semiconductor switch 350 and the components of the drive circuit except capacitor 372 not previously stated to be on semiconductor chip 42 may be on the same semiconductor chip as the chip containing semiconductor switch 150 (semiconductor chip 42) or may be a different semiconductor chip (not illustrated). Capacitor 372 is preferably a small ceramic capacitor and can by bonded directly to pads (not illustrated) on the semiconductor chip containing semiconductor switch 350 or can be located elsewhere.

The circuit to drive semiconductor switch 350 provides the required signals at the gate electrode 364 in accordance with the output signal of logical OR circuit 140. When the output of logical OR circuit 140 is at logic low the voltage at gate electrode 364 of semiconductor switch 350 is at about ground potential. When the output of logical OR circuit 140 is at logic high the voltage at gate electrode 364 is about twelve volts greater than the voltage at source electrode 356.

The turnon of semiconductor switch 350 is initiated by triple delay circuit 170. The least delayed signal from triple delay circuit 170 is supplied through conductor 382 to the anode of diode 374. The signal from the cathode of diode 374 is applied through conductor 384 to terminal 386 of capacitor 372 and is also connected through conductor 384 with gate electrode 364 of semiconductor switch 350. The signal with the intermediate delay is applied through conductor 388 to terminal 392 of capacitor 372. The undelayed output of logical OR circuit 140 is applied through conductors 144 and 342 to the input of inverter 376. The output of inverter 376 is applied to the gate of switching transistor 378 and controls whether it is conducting or not. When the output of inverter 376 is at logic high switching transistor 378 conducts and when the output of inverter 376 is at logic low switching transistor 378 does not conduct. The source electrode 394 of switching transistor 378 is connected through conductors 200 and 300 and terminal 202 with the ground side of the vehicle electrical system. The drain electrode 396 of switching transistor 378 is connected through conductor 384 with gate electrode 364 of semiconductor switch 350.

Figure 11:
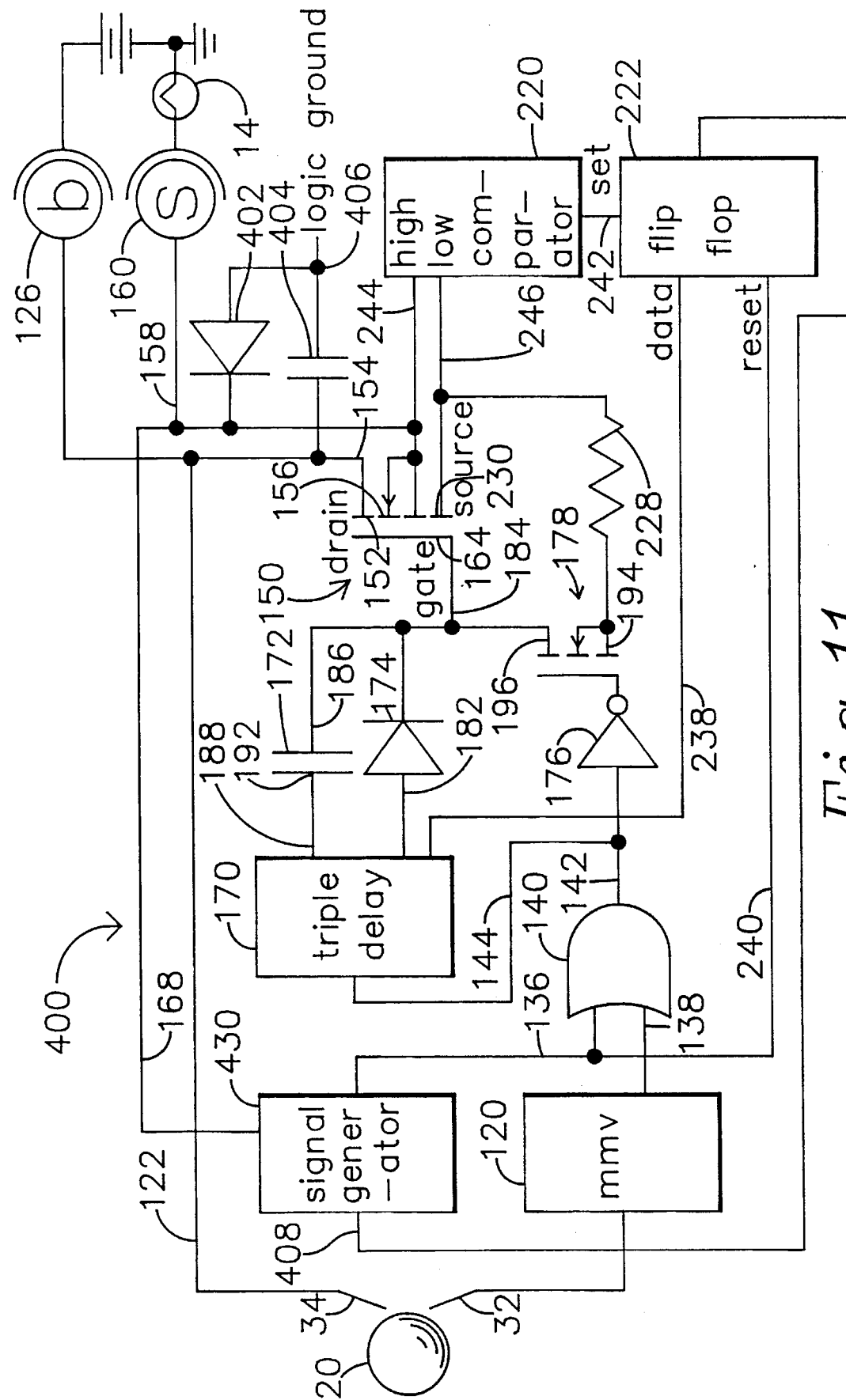
FIG. 11 shows a schematic diagram similar to that of FIG. 7 but illustrating a crash sensor and diagnostic unit requiring only two wires.
Figures 12, 13:
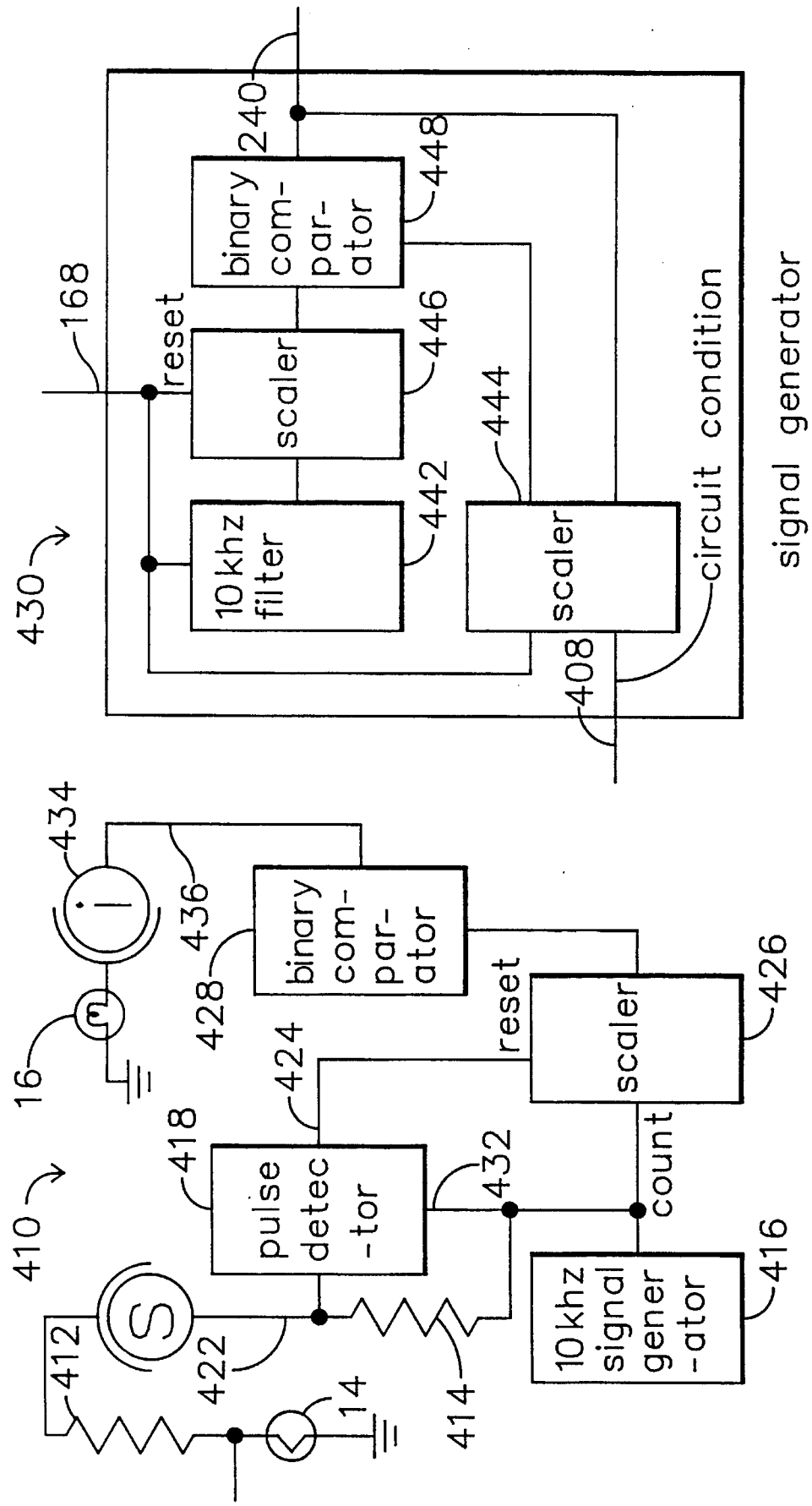
FIG. 12 shows a schematic diagram of a diagnostic module for interfacing with the crash sensor and diagnostic unit of FIG. 11.
FIG. 13 shows a schematic diagram of the signal generator of the circuit of FIG. 11.

A third embodiment of the electronic circuit of the crash sensor and diagnostic system of the invention which requires only two wires from the crash sensor and diagnostic circuit to the vehicle electrical system will now be described with reference to FIGS. 11, 12, and 13. The circuit of the crash sensor and diagnostic system 400 of FIG. 11 is the same as the circuit of FIG. 8 except that 1.0 hertz signal generator 130 is replaced by signal generator 430 and three connections to the vehicle electrical system and certain associated components have been eliminated. The crash sensor and diagnostic circuit 400 also differs from the circuit of FIG. 8 in that it includes diode 402 and capacitor 404 and in that the output of flip flop 222 is connected to an input of signal generator 430 rather than to operator warning light 16. Diode 402 and capacitor 404 are connected in series between conductor 154 and conductor 158. Conductor 154 is connected through terminal 126 with the high voltage side of the vehicle electrical system. Conductor 158 is connected through terminal 160 with the firing circuit side of squib 14 which is at ground potential at all times except when power is being applied to squib 14. The junction 406 between diode 402 and capacitor 404 provides a source of ground potential at times including when the squib is being powered thereby maintaining stable operation of the crash sensor and diagnostic system 400 at all times and with only two conductors connecting it to the vehicle electrical system. FIG. 13 illustrates signal generator 430 and shows the functional blocks internal to signal generator 430. The electronic circuit of FIGS. 11 and 13 is designed to operate in association with the diagnostic module 410 illustrated in FIG. 12.

The diagnostic module 410 illustrated in FIG. 12 operates to interpret the timing of firing circuit test pulses from crash sensor and diagnostic systems 400 and turn on the operator warning light 16 upon determining that a diagnostic circuit has detected a failure in a firing circuit. The diagnostic module 410 is described in the following. It comprises the resistors 412 and 414, ten kilohertz signal generator 416, pulse detector 418, scaler 426, and binary comparator 428 with an output adapted to drive operator warning light 16. Pulse detector 418 is adapted to monitor the firing circuit at conductor 422 and provide an output signal to conductor 424 when it detects vehicle electrical system power being applied to squib 14. Pulse detector 418 may be a level sensing comparator followed by a monostable multivibrator or it may be any other circuit suitable for generating a signal when a predetermined level shift is detected. Resistor 412 isolates diagnostic module 410 from the firing circuit thereby eliminating any possibility that a failure in the diagnostic module 410 will interfere with deployment of the occupant protection systems. Ten kilohertz signal generator 416 provides a clock signal to scaler 426 and to the crash sensor and diagnostic systems 400 through resistor 414, conductor 422, and resistor 412 to the firing circuit. The frequency of ten kilohertz is exemplary and any other suitable clock frequency may be substituted. In particular, when binary scalers are used a frequency of 16384 hertz is appropriate for obtaining times in multiples of one second. Resistor 414 diminishes the magnitude of the clock signal so it does not interfere with detection of the firing circuit pulse. The clock signal may also be provided through conductor 432 to pulse detector 418 which may use the signal received through that input to aid in distinguishing the clock signal from a firing circuit pulse. Scaler 426 is adapted to count cycles of the clock signal from ten kilohertz generator 416 and to be reset to zero by the trailing edge of each output signal from pulse detector 418. Scaler 426 is also adapted to provide the current count of clock cycles to binary comparator 428. Binary comparator 428 is adapted to compare the current count of clock cycles from scaler 426 with a maximum value maintained within itself or elsewhere and provide power through terminal 434 to operator warning light 16 if the output of scaler 426 exceeds a predetermined numerical limit indicating a defect in the firing circuit.

Signal generator 430 is adapted to produce signals timed according to the condition of the firing circuit and the number of firing circuit tests performed since the last time signal generator 430 produced an output signal. The signal generator 430 comprises ten kilohertz filter 442, scalers 444 and 446, and binary comparator 448. The ten kilohertz filter 442 is adapted to distinguish the ten kilohertz clock signal received through conductor 168 from signal generator 416 from the other signals on the firing circuit and provide a clean ten kilohertz clock signal to scaler 446. Scaler 444 is adapted to provide a particular binary value to binary comparator 448. The value provided depends on the whether the circuit condition input received through conductor 408 is at logic high or low and on the number of test pulses that have been received from the firing circuit through conductor 168 since the last output signal from signal generator 430. A particular set of values will be described hereinafter in the description of the operation of signal generator 430. Scaler 446 is adapted to count the number of clock cycles since the last test pulse on the firing circuit and provide that count to binary comparator 448. Binary comparator 448 is adapted to provide an output signal to conductor 240 when it determines that the two binary inputs are equal. This output signal provided to conductor 240 is the output of signal generator 430 to the circuit of FIG. 11.

The operation of the crash sensor and diagnostic system of this invention, excluding the electronic circuit, will now be described with reference to FIGS. 4 through 7, 14, 15, 16, and 17.

In operation of the system, ball 20 is held in its normal resting position by the attraction of magnet 54. When a deceleration much greater than one g is applied to the crash sensor, as would happen during an automobile crash, the inertia of the ball 20 causes it to move away from its normal resting position and toward electrical contacts 32 and 34. For this movement to occur it is necessary for some of the air in chamber 21 to pass either through the annular gap between ball 20 and tube 24, 124, or housing 224 or through channels 66, 166 or 266 into the chamber 23. To minimize uncertainty in the resistance to the viscous flow the clearance between the ball and tube should be such that the preponderance of the air passes through the channels 66, 166, or 266. The movement of the air whether through the gap between the ball and tube or through the channels is resisted by the viscosity of the air thereby causing a pressure differential with the pressure in chamber 21 being greater than the pressure in chamber 23. This pressure differential opposes the movement of ball 20 toward electrical contacts 32 and 34 so that contact is not achieved until a predetermined velocity change has occurred.

When the ball contacts both electrical contacts current flows from contact 34 through ball 20 to contact 32.

At lower ambient temperatures the clearance between ball 20 and tube 24 or 124 or housing 224 decreases because the thermal coefficient of expansion of the tube is greater than that of the ball. This increases the viscous resistance to the movement of air through the clearance gap at lower temperatures. However, in most of the designs with air channels the change in gap between the ball and the tube will not compensate for the change of air viscosity with temperature. Unless the tube is made of plastic having a very large coefficient of thermal expansion or the gap between the ball and tube allows a substantial fraction of the air to pass between the ball and the tube, the differential thermal expansion of the tube relative to the ball will not completely compensate for the reduced viscosity of air at the lower temperatures.

Figure 4:
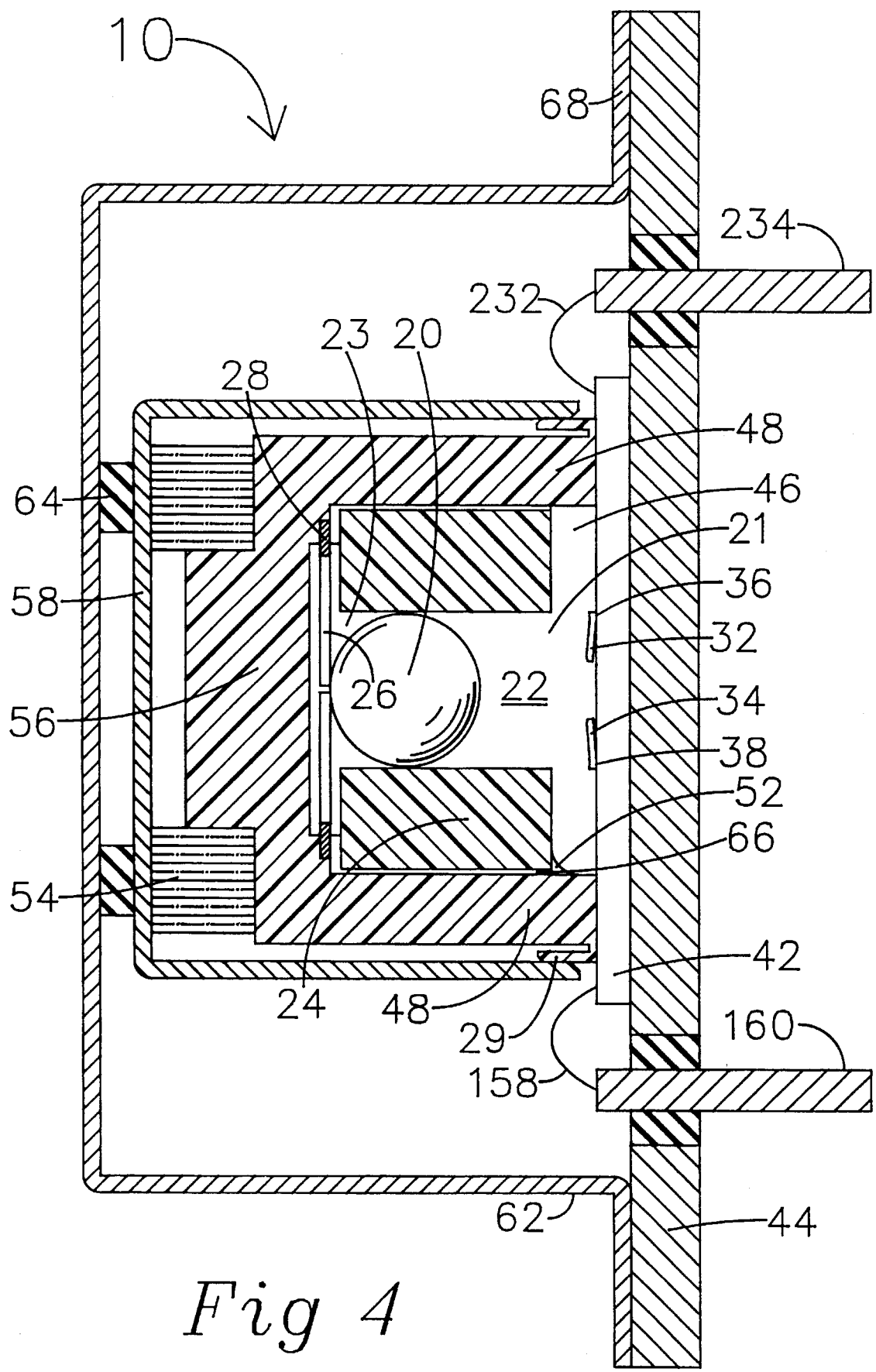
FIG. 4 shows a complete crash sensor of the invention with certain parts shown in section and the ball in its normal or resting position.
Figure 5:
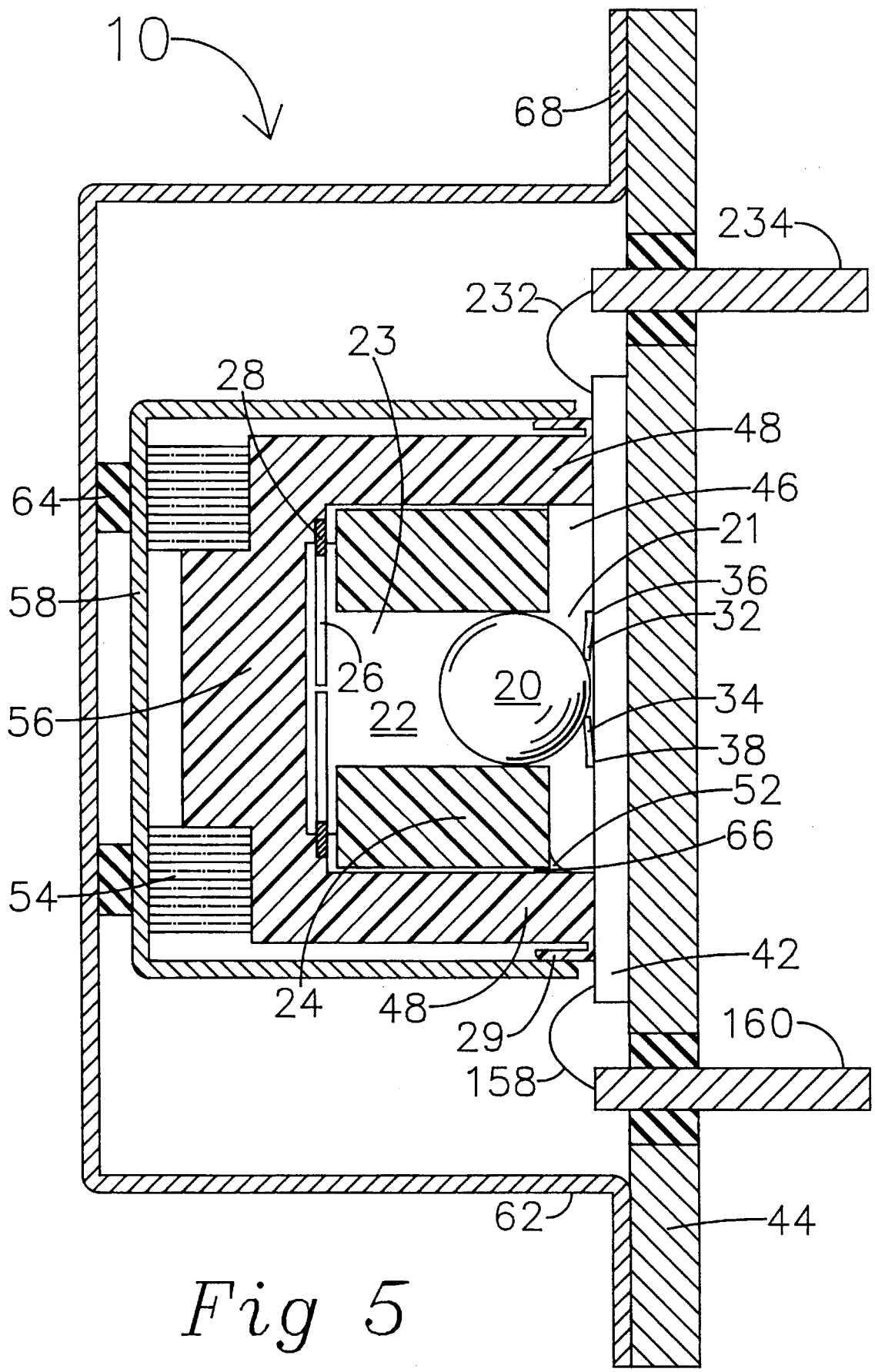
FIG. 5 shows the crash sensor as illustrated in FIG. 4 but with the ball in its closed position bridging the contacts for initiating operation of the occupant protection system.

In the embodiment illustrated in FIGS. 4 and 5 additional compensation is obtained by having the fingers 26 of bimetallic washer 28 vary the normal resting position of ball 20 as a function of temperature. At lower temperatures fingers 26 curve away from contacts 32 and 34 to change the resting position of ball 20 to increase the travel required to bridge contacts 32 and 34. At higher temperatures fingers 26 curve toward contacts 32 and 34 to change the resting position of ball 20 to decrease the travel required to bridge contacts 32 and 34. At lower temperatures the clearance between the ball and the cylinder decreases thereby reducing the flow of air through the clearance gap and at higher temperatures the clearance increases thereby compensating to some degree for the higher viscosity of air at higher temperatures. The bimetallic washer 28 is designed to provide the variation of the ball resting position with temperature to provide whatever additional compensation is required over and above the compensation resulting from variation with temperature of the clearance gap between ball 20 and tube 24.

In the embodiment illustrated in FIGS. 14, 15, and 16 the different thermal expansion coefficients of housing 148 and tube 124 provide the necessary compensation for change of air viscosity with temperature. At low temperatures tube 124 fits quite closely inside housing 148 and the gap 94 between them is very narrow. As the temperature increases housing 148 expands at a greater rate than tube 124 and the gap 94 increases. However, over the entire operating temperature range the gap 94 remains narrow so that at even the highest operating temperatures only a small fraction of the air passes through gap 94. The preponderance of the air passes through channels 166 which change in height as the tube and housing expand differently. When the temperature increases housing 148 expands more rapidly than tube 124 which increases the height of the channels 166 thereby allowing easier passage of air through the channels and compensating for the higher viscosity of the air at higher temperatures. When the temperature decreases housing 148 contracts more rapidly than tube 124 which decreases the height of the channels 166 thereby making passage of air through the channels more difficult and compensating for the lower viscosity of air at lower temperatures.

In the embodiment illustrated in FIG. 17 the different thermal expansion coefficients of ball 20 and housing 224 provide the necessary compensation for changes of air viscosity with temperature. At low temperatures housing 224 fits quite closely around ball 20 and the gap 294 between them is very narrow. As the temperature increases housing 224 expands at a greater rate than ball 20 and the gap 294 increases. However, over the entire operating temperature range the gap 294 remains narrow so that at even the highest operating temperatures only a small fraction of the air passes through gap 294. The preponderance of the air passes through channels 266 which change in height as the ball and housing expand differently. When the temperature increases housing 224 expands more rapidly than ball 20 which increases the height of the channels 266 thereby allowing easier passage of air through the channels and compensating for the higher viscosity of the air at higher temperatures. When the temperature decreases housing 224 contracts more rapidly than ball 20 which decreases the height of the channels 266 thereby making passage of air through the channels more difficult and compensating for the lower viscosity of air at lower temperatures.

In one embodiment of the invention the total compensation for the effect of temperature on air viscosity is achieved by selecting the diameters of ball 20 and tube 24 or 124 or housing 224 according to the analysis presented in the section entitled THEORY OF AIR DAMPED CRASH SENSORS so that the temperature compensation is correct for the materials of which the ball and tube are made. In this embodiment there is no need for air channels and the tube 24 or 124 and housing 48 or 148 respectively may be combined into a unitary plastic molding like housing 224 illustrated in FIG. 17 but without the flutes for forming air channels. The advantage of this design is that it may be easier in some materials to produce a tube without axial channels. One disadvantage is that the position of the ball is not so well determined which can lead to variation in the performance as discussed hereinabove. A second disadvantage is that the choice of materials is more restricted by the need for a particular difference between the thermal expansion coefficients of the ball and tube.

The operation of the vibration isolating mounting will now be described with reference to FIG. 7. The cup shaped resilient support 70 is much more resistant to movement of crash sensor and diagnostic system 400 in the direction that stretches the sides of the cup than it is to lateral movement (which is perpendicular to the axis of ball movement). During a car crash the crash sensor experiences axial accelerations (in the direction of the axis of ball movement) that may exceed one hundred g's (one hundred times the acceleration of gravity). The axial accelerations tend to stretch the sides of resilient support 70 but the sides are resistant to stretching and therefore transmit axial accelerations directly to crash sensor and diagnostic system 400. During a car crash there may also be lateral or cross axis accelerations of a similar magnitude. The crash sensor is insensitive to cross axis accelerations (as distinct from vibrations) which have only the effect of causing the ball 20 to roll down one side of the tube 24, 124, or housing 224. In the event of sufficiently high cross axis accelerations the crash sensor and the part of resilient support 70 nearest the crash sensor move laterally until the resilient support contacts the wall of housing 80. Cross axis vibrations occur having frequencies upwards of two hundred cycles per second and maximum accelerations also approaching 100 g's. These vibrations can have the effect of causing the ball 20 to oscillate in the tube or to roll around the circumference of the tube which slows the movement of ball 20 toward the contacts 32 and 34 and is undesirable. Resilient support 70 isolates crash sensor and diagnostic system 400 from cross axis vibrations by allowing the outer enclosure to vibrate in the cross axis direction with minimal transmission to the crash sensor and diagnostic system 400.

The operation of the electronic part of the crash sensor and diagnostic system will now be described with reference to FIG. 8. The crash sensing function of the circuit will be described first, followed by a description of the diagnostic function.

When the ball 20 bridges contacts 32 and 34 the voltage of the positive voltage side of the vehicle electrical system is applied to the trigger input of monostable multivibrator 120. This causes the output of monostable multivibrator 120 to go to logic high and remain there for about one second. This level is applied through conductor 138 to one input of logical OR circuit 140. This causes the output of logical OR circuit 140 to go to logic high to energize the firing circuit and initiate operation of the occupant protection devices.

The firing circuit is energized when semiconductor switch 150 closes. To close semiconductor switch 150 the voltage at gate electrode 164 must be raised to about ten volts positive with respect to source electrode 156.

During normal operation the voltage at gate electrode 164 is maintained at a low level by switching transistor 178. Before a high control signal is applied to gate electrode 164, switching transistor 178 is turned off. To accomplish this, when the output of logical OR circuit 140 goes to logic high the output of inverter 176 goes to logic low and this logic low level is applied to the gate of switching transistor 178 and turns it off.

After a delay sufficient to insure that switching transistor 178 is in its off state triple delay circuit 170 turns on its least delayed signal. This signal is supplied through diode 174 to terminal 186 of capacitor 172 and to gate electrode 164 of semiconductor switch 150. At this time the intermediately delayed signal from triple delay circuit 170 is at logic low and is being applied to terminal 192 of capacitor 172. The signal from diode 174 raises the voltage at gate electrode 164 and charges capacitor 172 to the high output voltage of triple delay circuit 170. After a delay sufficient to insure that capacitor 172 is fully charged triple delay circuit 170 turns on its intermediately delayed signal which is applied to terminal 192 of capacitor 172. Capacitor 172 couples this voltage increase to gate electrode 164 of semiconductor switch 150 which raises its voltage to the required level to turn semiconductor switch 150 on. Turning semiconductor switch 150 on supplies the voltage of the positive voltage side of the vehicle electrical system through conductor 158 and terminal 160 to the firing circuit to initiate operation of the occupant protection systems.

The diagnostic function of the circuit of FIG. 8 will now be described. The diagnostic part of the circuit operates to turn on operator warning light 16 when the resistance of the firing circuit is not within predetermined limits. To accomplish this the output of flip flop 222 is set to logic high whenever the resistance is determined to be outside the predetermined limits. The output of flip flop 222 drives operator warning light 16 through diode 225.

The resistance of the firing circuit is determined once each second by the process described in the following. One cycle per second was chosen because it is a suitable frequency but testing may be done at any other suitable frequency. The output of the 1.0 hertz signal generator 130 is a test signal that is applied to an input of logical OR circuit 140 and to the reset input of flip flop 222. Signal generator 130 is designed to not generate a test signal when another crash sensor is testing the firing circuit but to wait until the inhibit signal supplied through conductor 168 to the inhibit input of 1.0 hertz signal generator 130 returns to its low level before generating a test signal. The logic high output of 1.0 hertz signal generator 130 causes the output of logical OR circuit 140 to go to logic high during the test pulse. In the same manner as described with regard to the crash sensing function of the circuit, the test pulse from logical OR circuit 140 causes semiconductor switch 150 to be turned on for the duration of each test pulse. The test pulse also resets flip flop 222 in preparation for setting if the resistance of the firing circuit is outside the predetermined limits. The test pulses are of sufficiently short duration that the squibs 14 of the occupant protection devices are not heated.

The resistance of the firing circuit is determined by high-low comparator 220 which compares the voltage across resistor 228 with the voltage across the firing circuit. As described above, when the resistance of the firing circuit is the nominal value the voltage across resistor 228 equals the voltage across the firing circuit while semiconductor switch 150 is in its on state. While the resistance of the firing circuit is within predetermined limits about the nominal value and semiconductor switch 150 is in its on state the voltage across resistor 228 is within predetermined limits above and below the voltage across the firing circuit and output of high-low comparator 220 is at logic low. Otherwise, it is at logic high.

After semiconductor switch 150 has been on for a sufficient time to insure that the output of high-low comparator 220 has stabilized triple delay circuit 170 supplies its most delayed signal to the data input of flip flop 222. If the set input of flip flop 222 is also at logic high, which would happen if the resistance of the firing circuit were outside the predetermined limits, then flip flop 222 is put in its set state and its output goes to a high level that is transmitted by diode 225, conductor 232 and terminal 234 to operator warning light 16 and turns it on. If it is turned on, the operator warning light 16 remains on for one second and is then turned off by the next test pulse. If the resistance of the firing circuit continues to be outside its limits operator warning light 16 will be turned back on immediately and will appear to the driver to be on continuously.

In the embodiment of the invention illustrated in FIG. 2 the resistance sensed by the diagnostic circuit is the combined resistance of all the resistances in the wiring and the squibs plus the resistance of diagnostic resistor 219. The resistance of diagnostic resistor 219 is sufficient to prevent deployment of the occupant protection systems if crash sensor 12 closes when the safing sensor 19 is not closed. For typical systems this dictates that the value of diagnostic resistor 219 be about 100 ohms. This is much lower than the diagnostic resistance of current systems and enables much more accurate determination of the condition of the firing circuit than is possible with current systems. Diagnostic resistor 219 may be a fusible resistance that opens if the battery circuit voltage is applied to it for an excessively long time, such as ten seconds. Opening of the diagnostic resistance disarms the occupant protection system thereby protecting against a shorted condition in a crash sensor that might be caused by a failure of a semiconductor and causes the operator warning light 16 to be turned on because the firing circuit resistance is outside of the predetermined limits.

The inhibit signal provided to the 1.0 hertz signal generator enables more than one crash sensor to be connected to the firing circuit by preventing more than one crash sensor from simultaneously testing the resistance of the firing circuit. If two crash sensors are connected to the firing circuit and the first crash sensor is testing the resistance of the firing circuit the high voltage in the firing circuit will be supplied to the inhibit input of the 1.0 hertz signal generator of the second crash sensor and delay its test pulse until the first crash sensor has completed its testing. Similarly, if the second crash sensor is testing the resistance of the firing circuit the 1.0 hertz signal generator of the first crash sensor delays its signal. The two crash sensors connected in parallel may be enclosed in the same housing as illustrated in FIG. 9 or may be mounted at different locations in the vehicle. In the former case the reliability of the system is enhanced because if one of the crash sensors fails the other will cause deployment of the occupant protection system during a crash.

The operation of a second embodiment of the electronic part of the crash sensor and diagnostic system will now be described with reference to FIG. 10. The circuit of FIG. 10 is the same as the circuit of FIG. 8 except for the addition of semiconductor switch 350 and related components. All components previously described operate in the same manner as described hereinabove with respect to FIG. 8 except that the drain electrode of semiconductor switch 150 is connected to the source electrode of semiconductor switch 350 and receives power only when semiconductor switch 350 is conducting.

The firing circuit is energized when semiconductor switches 150 and 350 close. The closing of semiconductor switch 150 has already been described with reference to FIG. 8. To close semiconductor switch 350 the voltage at gate electrode 364 must be raised to about ten volts positive with respect to source electrode 356.

During normal operation the voltage at gate electrode 364 is maintained at a low level by switching transistor 378. Before a high control signal is applied to gate electrode 364, switching transistor 378 is turned off. To accomplish this, when the output of logical OR circuit 140 goes to logic high the output of inverter 376 goes to logic low and this signal is applied to the gate of switching transistor 378 and turns it off.

After a delay sufficient to insure that switching transistors 178 and 378 are in their off state triple delay circuit 170 turns on its least delayed signal. This signal is supplied through diode 374 to terminal 386 of capacitor 372 and to gate electrode 364 of semiconductor switch 350. At this time the intermediately delayed signal from triple delay circuit 170 is at logic low and is being applied to terminal 392 of capacitor 372. The signal from diode 374 raises the voltage at gate electrode 364 and charges capacitor 372 to the high output voltage of triple delay circuit 170. After a delay sufficient to insure that capacitor 372 is fully charged triple delay circuit 170 turns on its intermediately delayed signal which is applied to terminal 392 of capacitor 372. Capacitor 372 couples this voltage increase to gate electrode 364 of semiconductor switch 350 which raises its voltage to the required level to turn semiconductor switch 350 on. Turning semiconductor switch 350 on supplies the voltage of the positive voltage side of the vehicle electrical system through conductor 354 to the drain electrode of semiconductor switch 150. Semiconductor switch 350 is turned on at the same times as semiconductor switch 150 which enables semiconductor switch 150 it to operate in the same manner as described hereinabove with respect to FIG. 8. However, if semiconductor switch 150 has failed in a manner that causes it to conduct continuously whether or not its gate voltage is commanding it to conduct then power will not be supplied through semiconductor switch 150 to squib 14 until semiconductor switch 350 is turned on, thereby preventing deployment of the occupant protection device caused by an internal short in semiconductor switch 150. Further, failure of semiconductor switch 150 will almost certainly cause its internal resistance to change in a way that will cause high low comparator 220 to indicate a malfunction of the occupant protection system and the driver will be warned of the failure.

The operation of a third embodiment of the electronic part of the crash sensor and diagnostic system will now be described with reference to FIGS. 11, 12, and 13. The operation of the circuit of FIG. 11 is the same as the operation of the circuit of FIG. 8 except that the replacement of 1.0 Hertz signal generator 130 with signal generator 430 affects the timing of the test pulses applied to the squib 14. All components present in the circuit of FIG. 8 operate in the same manner in the circuit of FIG. 11 as described hereinabove with respect to FIG. 8. Diode 402 and capacitor 404 have been added to stabilize the power supply voltage and allow operation with only two connections to the vehicle wiring system. Diode 402 and capacitor 404 operate by connecting the logic ground circuit of the components of FIG. 11 to the squib 14 through diode 402, conductor 158, and terminal 160. Except for certain brief times when a pulse is being applied to the squib 14 the squib functions as an approximately one ohm resistance to ground thereby causing the junction 406 to be brought to ground level by diode 402 at most times. When battery voltage is being applied to squib 14 diode 402 isolates junction 406 from the high voltage and capacitor 404 stabilizes the voltage at junction 406.

The timing of the test pulses for testing the firing circuit will be described in the following. The circuit of FIG. 11 operates in the same manner as the circuit of FIG. 8 to connect vehicle power to squib 14 when the output of logical OR circuit 140 is at logic high. The output of logical OR circuit is logic high when either of its inputs is at logic high which happens, as previously described with reference to FIG. 8, whenever ball 20 bridges contacts 32 and 34 or the output of signal generator 430 is at logic high, Signal generator 430 periodically places brief logic high output signals on conductor 240 for initiating testing of the firing circuit. The timing of these signals is accurately controlled for the purpose of transmitting information about the condition of the firing circuit. The particular timings presented hereinafter are exemplary. Those skilled in the art may substitute any suitable timings. It will also be evident to those skilled in the art that other timing circuits including analog timing circuits could be substituted for the circuits described herein for accomplishing the equivalent function. If the circuit condition input received through conductor 408 is at logic high, which indicates an incorrect firing circuit resistance has been detected, then signal generator 430 produces output signals at eight second intervals. If the circuit condition input received through conductor 408 is at logic low, which is the normal condition, then signal generator 430 produces output signals timed according to the following: After issuing an output signal and before any subsequent test pulses are received through conductor 168 signal generator 430 waits until three seconds have elapsed since producing the output signal then produces another output signal. If a test pulse is received through conductor 168 before the three seconds have elapsed then signal generator 430 starts another waiting period and waits until two seconds have elapsed since receiving the test pulse then produces another output signal. If a second test pulse is received through conductor 168 before the two seconds have elapsed then signal generator 430 starts another waiting period and waits until one second has elapsed since receiving the second test pulse then produces another output signal.

Consider, now, the normal operation in the case when the occupant protection system of a vehicle includes three of the crash sensor and diagnostic systems 400. Assume that the signal generator 430 of the first of the crash sensor and diagnostic systems 400 has just issued an output signal that has caused a test pulse to be applied to the firing circuit and it is in the process of waiting three seconds before issuing an output signal. However, each of the signal generators 430 of the second and third crash sensor and diagnostic systems 400 has sensed the test pulse just issued on the firing circuit and each is in the process of waiting two seconds or less before issuing its next output signal. One of the signal generators 430 of the second and third crash sensor and diagnostic systems 400 will therefore issue its output signal before the signal generator 430 of the first crash sensor and diagnostic system 400. The resulting test pulse will cause the signal generator 430 of the first crash sensor and diagnostic system 400 to start another waiting period and wait two seconds before producing an output signal. However, one of the signal generators 430 of the second and third crash sensor and diagnostic systems 400 has sensed the previous two test pulses issued on the firing circuit and is in the process of waiting one second before issuing its next output signal. It will therefore issue its output signal before the signal generator 430 of the first crash sensor and diagnostic system 400. The resulting test pulse will cause the signal generator 430 of the first crash sensor and diagnostic system 400 to start another waiting period and wait one second before producing an output signal. In this cycle both of the other of the signal generators 430 of the second and third crash sensor and diagnostic systems 400 has issued an output signal more recently than the signal generator 430 of the first crash sensor and diagnostic system 400 and each is in the process of waiting two seconds or more before issuing its next output signal. The signal generator 430 of the first crash sensor and diagnostic system 400 will therefore issue its output signal when one second has elapsed since the previous test pulse and the first crash sensor and diagnostic system 400 will issue a test pulse. Since all of the crash sensor and diagnostic units 400 operate similarly they operate in a cyclic manner to each generate in its turn a test pulse and the three of them together operate to produce test pulses on the firing circuit at 1.0 second intervals.

Consider, now, the operation of the above considered crash sensor and diagnostic system 400 in the event of a firing circuit defect. Assume, for example, that one of the crash sensor and diagnostic systems 400 has become disconnected or has detected a firing circuit resistance outside acceptable limits. In either case it will not apply a test pulse to the firing circuit after a one second waiting period when its turn arrives to do so. Further, each of the signal generators 430 of the other two crash sensor and diagnostic systems 400 is in the process of waiting two seconds or more before issuing its next output signal. Therefore, the next test pulse will be applied after an interval of two seconds rather than the normal interval of one second. By similar reasoning it will be seen that any combination of failures will lead to test pulses being generated at intervals other than one second thereby resulting in a system wherein test pulses are applied to the firing circuit at intervals of one second if and only if all crash sensor and diagnostic systems 400 are connected and measure the correct diagnostic circuit resistance. It will now be obvious that similar systems could be designed using other than three of the crash sensor and diagnostic systems 400 and that other time intervals besides those described above could be substituted with equivalent results.

The operation of diagnostic module 410 will now be described with reference to FIG. 12. Diagnostic module 410 operates to monitor the firing circuit and measure the time interval between test pulses and turn on operator warning light 16 on the vehicle dashboard if the test pulses do not occur at the expected one second time interval. Ten kilohertz signal generator 416 operates at all times to generate clock signals at the rate of ten thousand per second. These clock signals are supplied to scaler 426 and to pulse detector 418. Also, the clock signals are supplied to the firing circuit after attenuation by the voltage divider consisting of the series combination of resistors 414 and 412 and the squib 14. Scaler 426 is adapted to increment its counter each time a clock signal is received at its count input through conductor 432 and to reset its counter to zero each time a reset signal is received at its reset input through conductor 424. Pulse detector 418 monitors the firing circuit and produces a logic high signal at its output conductor 424 during each diagnostic pulse it detects on the firing circuit. It may use the ten kilohertz clock signal received on conductor 432 to further aid in distinguishing a diagnostic pulse from a clock signal. Means for using a signal for distinguishing that signal from another signal are well known to those in the communications art and are not further described herein. The output of pulse detector 418 is supplied through conductor 424 to the reset input of scaler 426. Binary comparator 428 compares the digital output of scaler 426 with a maximum value of ten thousand which corresponds to the number of clock cycles produced by ten kilohertz signal generator 416 in one second. If the digital output of scaler 426 exceeds ten thousand then binary comparator 428 provides power through conductor 436 and terminal 434 for powering operator warning light 16.

The operation of signal generator 430 will now be described with reference to FIG. 13. Signal generator 430 operates to receive both the ten kilohertz clock signal and the test pulses on conductor 168 from the firing circuit and use that information to generate signals for initiating test pulses for testing the firing circuit. Ten kilohertz filter 442 receives on conductor 168 the ten kilohertz clock signal placed on the firing circuit by ten kilohertz signal generator 416 of diagnostic module 410 and amplifies it for driving scaler 446. Scaler 446 continuously counts the ten kilohertz clock signal from ten kilohertz filter 442 and provides the binary value of its counter to binary comparator 448. Scaler 446 is reset to zero by each test pulse on the firing circuit therefore the binary value of its counter is the time in units of 0.0001 second since the most recent test pulse. Binary comparator 448 provides logic high at its output to conductor 240 when its two inputs are equal and logic low at other times. The output of binary comparator 448 provided to conductor 240 is the output of signal generator 430 and is at logic high at the appropriate times for initiating test pulses on the firing circuit. Scaler 444 generates a binary number according to the state of its circuit condition input received through conductor 408 and to the number of test pulses received on conductor 168 from the firing circuit since the most recent logic high output signal from binary comparator 448. Scaler 444 provides the binary number it generates to an input of binary comparator 448. In normal operation, that is when the circuit condition input received through conductor 408 is at logic low, the output is a binary number that is initialized by a logic high output from binary comparator 448 and is decremented by each test pulse received on conductor 168 from the firing circuit. For example when the clock rate is ten kilohertz scaler 444 is initialized to 30,000 which is the number of clock cycles in three seconds and is decremented to 20,000 the first time a test pulse is received on conductor 168 from the firing circuit and is decremented again to 10,000 when a second test pulse is received thereby causing time intervals of three, two, and one second between output pulses of signal generator 430. Scaler 444 is not decremented below 10,000. When there is a defect in the firing circuit causing the circuit condition input received on conductor 408 to be at logic high the output of scaler 444 is forced to a binary number corresponding to eight seconds. Since the exact value of eight seconds is not important the forcing of the output can be simply accomplished by forcing one or more of the higher order output lines to be on whenever the circuit condition input received through conductor 408 is at logic high. Accordingly, the signal generator 430 operates in the following manner: When there is a defect in the firing circuit the circuit condition input received through conductor 408 is at logic high and scaler 446 increments once each clock cycle until eight seconds have elapsed since the last firing circuit test pulse at which time the output of scaler 446 equals the output of scaler 444 for one clock cycle and the output of binary comparator 448 raises output conductor 240 to logic high during that clock cycle. During normal operation the circuit condition input received through conductor 408 is at logic low. To provide a starting point assume for the following description that signal generator 430 has just provided an output signal to conductor 240. Under the assumed conditions scaler 446 has just been reset to zero and scaler 444 has just been set to a binary value corresponding to three seconds of clock cycles. Therefore, under the assumed conditions, scaler 446 is prepared to increment once each clock cycle until three seconds have elapsed since the last firing circuit test pulse at which time the output of scaler 446 would equal the output of scaler 444 for one clock cycle and the output of binary comparator 448 would raise output conductor 240 to logic high during that clock cycle. However, during normal operation another crash sensor and diagnostic system 400 will place a test pulse on the firing circuit before the three seconds have elapsed. The test pulse received on conductor

168 will reset scaler 446 to zero and decrement scaler 444 to a binary value corresponding to two seconds of clock cycles. Similarly to the previous condition, under the assumed conditions, scaler 446 is prepared to increment once each clock cycle until two seconds have elapsed since the last firing circuit test pulse at which time the output of scaler 446 would equal the output of scaler 444 for one clock cycle and the output of binary comparator 448 would raise output conductor 240 to logic high during that clock cycle. As in the case of the three second wait, during normal operation another crash sensor and diagnostic system 400 will place a test pulse on the firing circuit before the two seconds have elapsed. The test pulse will be received on conductor 168 and reset scaler 446 to zero and decrement scaler 444 to a binary value corresponding to one second of clock cycles. In this case, scaler 446 increments once each clock cycle until one second has elapsed since the last firing circuit test pulse at which time the output of scaler 446 equals the output of scaler 444 for one clock cycle and the output of binary comparator 448 raises output conductor 240 to logic high during that clock cycle thereby generating an output signal that initiates a test pulse one second after the previous test pulse. In summary, signal generator 430 operates to maintain values in scaler 444 that result in issuing an output pulse eight seconds after the last test pulse on the firing circuit if the circuit condition input received through conductor 408 is at logic high and if the circuit condition input is at logic low to issue an output pulse at three seconds, two seconds, or one second after the last test pulse on the firing circuit depending respectively on whether zero, one, or two test pulses have been received on conductor 168 from the firing circuit since the last time binary comparator 448 raised output conductor 240 to logic high.

Although the description of this invention has been given with reference to a particular embodiment, it is not to be construed in a limiting sense. Many variations and modifications will now occur to those skilled in the art. For a definition of the invention reference is made to the appended claims.

What is claimed is:

1. In an electrical device in an automobile having an enclosure and having wires entering said enclosure, the improvement comprising:

said enclosure having a tubular element adapted for the passage of said wires entering said enclosure, a wrapper wrapped about said tubular element and also wrapped about a length of said wires, said length of said wires being outside of said tubular element and adjacent to one end of said tubular element, said wrapper comprising heat shrinkable tubing having a lining of meltable material that has been placed around said tubular element and said length of said wires and heated sufficiently to melt said meltable material and cause said heat shrinkable tubing to shrink.

2. The invention as defined by claim 1 and including:

a plurality of filaments disposed between said wrapper and said tubular element and extending parallel with the axis of said heat shrinkable tubing.

3. The invention as defined by claim 1 and wherein a segment of said tubular element is crimped about said wires.

\* \* \* \* \*